US012373741B2

(12) United States Patent
Choi et al.

(10) Patent No.: US 12,373,741 B2
(45) Date of Patent: Jul. 29, 2025

(54) PEDESTAL ON WHICH A TERMINAL PROVIDING SEAT-LIBRARY PAIRING SERVICE IS MOUNTED, SEAT-LIBRARY PAIRING METHOD AND SYSTEM USING SHORT-DISTANCE WIRELESS COMMUNICATION

(71) Applicant: HYBE Co., Ltd., Seoul (KR)

(72) Inventors: Bo Yoon Choi, Seoul (KR); Sung Joo Jeong, Seoul (KR); Hyeong Gu Kim, Seoul (KR); Da Hye Seo, Seoul (KR)

(73) Assignee: HYBE CO., LTD., Seoul (KR)

( * ) Notice: Subject to any disclaimer, the term of this patent is extended or adjusted under 35 U.S.C. 154(b) by 0 days.

(21) Appl. No.: 18/345,682

(22) Filed: Jun. 30, 2023

(65) Prior Publication Data
US 2024/0005221 A1 Jan. 4, 2024

(30) Foreign Application Priority Data
Jul. 4, 2022 (KR) .................... 10-2022-0081737
Sep. 21, 2022 (KR) .................... 10-2022-0119232

(51) Int. Cl.
| | | |
|---|---|---|
| *G06F 1/16* | (2006.01) | |
| *F16M 11/10* | (2006.01) | |
| *F16M 11/22* | (2006.01) | |
| *F21S 2/00* | (2016.01) | |
| *G06Q 10/02* | (2012.01) | |
| *G08B 5/38* | (2006.01) | |
| *F21W 131/406* | (2006.01) | |
| *H04B 1/3888* | (2015.01) | |

(52) U.S. Cl.
CPC ............. *G06Q 10/02* (2013.01); *F16M 11/10* (2013.01); *F16M 11/22* (2013.01); *F21S 2/00* (2013.01); *G08B 5/38* (2013.01); *F21W 2131/406* (2013.01); *H04B 1/3888* (2013.01)

(58) Field of Classification Search
CPC ........................... G06F 1/1632; G06F 1/1641
See application file for complete search history.

(56) References Cited

U.S. PATENT DOCUMENTS

| | | |
|---|---|---|
| 9,300,777 B2 | 3/2016 | Bonde |
| 10,003,485 B2 * | 6/2018 | Lu .......................... H05B 45/20 |
| 10,281,959 B2 | 5/2019 | Falk |
| 10,871,804 B2 | 12/2020 | Falk |
| 11,064,127 B2 | 7/2021 | Song et al. |
| 11,209,119 B2 | 12/2021 | Townsend |
| 11,297,253 B2 | 4/2022 | Song et al. |
| 11,452,192 B2 | 9/2022 | Kwon et al. |

(Continued)

FOREIGN PATENT DOCUMENTS

| | | |
|---|---|---|
| JP | 2005-71081 | 3/2005 |
| JP | 2015-73201 | 4/2015 |

(Continued)

*Primary Examiner* — Anthony Q Edwards
(74) *Attorney, Agent, or Firm* — KILE PARK REED & HOUTTEMAN PLLC

(57) ABSTRACT

A pedestal according to an embodiment of the present disclosure, on which a cheering stick and a terminal providing a seat-library to the cheering stick are mounted, comprises a main frame; a mounting portion included in the main frame and on which the terminal is mounted; and a cheering stick holder included in the main frame and on which the cheering stick is mounted.

18 Claims, 22 Drawing Sheets

(56) References Cited

U.S. PATENT DOCUMENTS

| | | |
|---|---|---|
| 11,647,297 B2 | 5/2023 | Song et al. |
| 11,678,423 B2 | 6/2023 | Kwon et al. |
| 12,120,799 B2 * | 10/2024 | Choi .................. A63J 5/02 |
| 2011/0057583 A1 * | 3/2011 | Fattizzi ............... H05B 47/155 |
| | | 362/205 |
| 2012/0269360 A1 * | 10/2012 | Burke .................... A47C 1/12 |
| | | 381/77 |
| 2014/0294173 A1 | 10/2014 | Bonde |
| 2017/0344077 A1 | 11/2017 | Falk |
| 2019/0294218 A1 | 9/2019 | Falk |
| 2019/0317704 A1 * | 10/2019 | Yanagi ................. G06F 3/1237 |
| 2019/0394860 A1 | 12/2019 | Choi et al. |
| 2020/0084360 A1 | 3/2020 | Song et al. |
| 2020/0241643 A1 * | 7/2020 | Kim ........................ G08B 5/38 |
| 2020/0393079 A1 | 12/2020 | Townsend |
| 2021/0076471 A1 | 3/2021 | Kwon et al. |
| 2021/0081001 A1 * | 3/2021 | Huang .................. G06F 1/1626 |
| 2021/0103318 A1 | 4/2021 | Falk |
| 2021/0136272 A1 | 5/2021 | Song et al. |
| 2021/0389803 A1 * | 12/2021 | Ciolek .................. G06F 1/1632 |
| 2022/0141943 A1 * | 5/2022 | Choi ....................... A63H 37/00 |
| 2022/0191375 A1 | 6/2022 | Song et al. |
| 2022/0386437 A1 | 12/2022 | Kwon et al. |
| 2023/0117158 A1 | 4/2023 | Choi |
| 2023/0209674 A1 | 6/2023 | Choi et al. |
| 2024/0008156 A1 * | 1/2024 | Choi .................... H05B 47/155 |

FOREIGN PATENT DOCUMENTS

| | | |
|---|---|---|
| JP | 2020-4703 | 1/2020 |
| JP | 2021-508147 | 2/2021 |
| JP | 2021-61250 | 4/2021 |
| JP | 2021-64613 | 4/2021 |
| KR | 10-2015-0136023 | 12/2015 |
| KR | 10-1730301 | 4/2017 |
| KR | 10-1788469 | 10/2017 |
| KR | 10-2018-0015701 | 2/2018 |
| KR | 10-2018-0015702 | 2/2018 |
| KR | 10-2018-0015703 | 2/2018 |
| KR | 10-1862689 | 5/2018 |
| KR | 10-1942809 | 1/2019 |
| KR | 10-2019-0141922 | 12/2019 |
| KR | 10-2020-0071711 | 6/2020 |
| KR | 10-2021-0119341 | 10/2021 |
| KR | 10-2021-0136814 | 11/2021 |
| KR | 10-2336353 | 12/2021 |
| KR | 10-2022-0084004 | 6/2022 |
| WO | 2021/210938 | 10/2021 |

* cited by examiner

| Identification number | Light emitting pattern | | | |
|---|---|---|---|---|
| | Power | Color | Brightness | Effect |
| 1 | ON | (255,0,0) | 50 | Blink |
| 2 | OFF | - | - | - |
| 3 | ON | (0,0,255) | 10 | Grad |

| Identification Nos. | Library identification Nos. | Duration |
|---|---|---|
| 001 | 0001 | 5sec |
| | 0002 | 3sec |
| | 0003 | 2sec |
| 002 | 0005 | 8sec |
| | 0001 | 30sec |
| | 0004 | 14sec |

1100, 1200

PEDESTAL ON WHICH A TERMINAL PROVIDING SEAT-LIBRARY PAIRING SERVICE IS MOUNTED, SEAT-LIBRARY PAIRING METHOD AND SYSTEM USING SHORT-DISTANCE WIRELESS COMMUNICATION

CROSS-REFERENCE TO RELATED APPLICATIONS

This application claims priority under 35 U.S.C 119(a) to Korean Patent Application No. 10-2022-0081737, filed on Jul. 4, 2022, and Korean Patent Application No. 10-2022-0119232, filed on Sep. 21, 2022, in the Korean Intellectual Property Office, the entire disclosure of which is incorporated herein by reference in its entirety.

TECHNICAL FIELD

The present disclosure relates to a pedestal on which a terminal providing a seat-library pairing service is mounted and a seat-library pairing method and system using short-distance wireless communication.

More specifically, the present disclosure relates to a pedestal on which a cheering stick having a light emission function and a terminal providing a seat-library to the cheering stick using short-distance wireless communication are mounted and a seat-library pairing method and system.

BACKGROUND

A glow-in-the-dark stick generally refers to a rod-shaped object coated with a fluorescent material or equipped with a separate battery to obtain a lighting effect.

Glow-in-the-dark sticks are used for nighttime activities, mountain climbing, various events, and cheering; in particular, since glow-in-the-dark sticks may be produced to display various colors, the glow-in-the-dark sticks are used as a cheering tool for the audience in the dark indoor spaces of various auditoriums including concert halls and are used as a tool for directing a performance to display the name of a singer or a specific pattern using the glow-in-the-dark sticks carried by a large number of audience.

According to the prior art, individual users download a library which pre-configures a light emitting pattern of their glow-in-the-dark sticks according to the signature color or song rhythm of their supporting team or artist in advance, and apply the library to their cheering sticks to fulfill a performance direction using the glow-in-the-dark sticks.

However, when a user fails to download the library in advance due to lack of time or unfamiliarity with a download operation, the user is unable to participate in the directed performance throughout the performance and has to endure the inconvenience of manually manipulating the cheering stick.

In addition, for a user to download the library in advance, it is essential to download a pairing application separately and perform a pre-pairing step; as the number of performances desired to watch increases, the time required for pairing increases accordingly, which is cumbersome and inconvenient.

In addition, when a user watches performances on several occasions and downloads a plurality of libraries, the amount of library data stored in the user's cheering stick becomes excessively large, and the possibility of a malfunction increases.

The above information disclosed in this Background section is only for enhancement of understanding of the background of the inventive concept, and, therefore, it may contain information that does not form the prior art that is already known in this country to a person of ordinary skill in the art.

SUMMARY

The present disclosure has been made to solve the problem of the prior art above and intends to provide a pedestal on which a terminal providing a seat-library pairing service is mounted and a seat-library pairing method and system using short-distance wireless communication.

Also, the present disclosure intends to provide a pairing method and system for storing a seat-library to cheering sticks using short-distance wireless communication before a performance to direct the entire cheering sticks in an integrated manner.

Also, the present disclosure intends to provide a seat-library pairing method and system using short-distance wireless communication with an intuitive user experience.

Additional aspects will be set forth in the detailed description which follows, and, in part, will be apparent from the disclosure, or may be learned by practice of the inventive concept.

A pedestal according to an embodiment of the present disclosure, on which a cheering stick and a terminal providing a seat-library to the cheering stick are mounted, comprises: a main frame; a mounting portion included in the main frame and on which the terminal is mounted; and a cheering stick holder included in the main frame and on which the cheering stick is mounted.

At this time, a first end of the mounting portion is connected to the main frame, and the first end of the mounting portion is configured to rotate against the main frame.

Also, the mounting portion comprises a rotating portion connected to a first side edge of the main frame; a main mounting portion connected to the rotating portion; and a wing portion comprising a first sub-wing portion and a second sub-wing portion disposed respectively on a first side and a second side of the main mounting portion.

Also, the mounting portion rotates to have a predetermined angle against the main frame using the rotating portion as a reference axis.

Also, the first sub-wing portion and the second sub-wing portion are formed to respectively extend in a first direction and a second direction away from the main mounting portion.

Also, the pedestal according to an embodiment of the present disclosure further comprises a supporting portion supporting the mounting portion so that the mounting portion rotates to have a predetermined angle against the main frame.

Also, the pedestal according to an embodiment of the present disclosure further comprises a tagging portion included in the main frame and tagged by a predetermined device.

Also, the cheering stick holder comprises an insertion hole formed in the main frame, in which the cheering stick is inserted.

Also, the cheering stick holder further comprises a plurality of cylindrical layers having different diameters contained within the insertion hole, wherein a second cylindrical layer of the plurality of cylindrical layers having a second diameter is contained inside a first cylindrical layer of the plurality of cylindrical layers having a first diameter, and a third cylindrical layer of the plurality of cylindrical layers having a third diameter is contained inside the second cylindrical layer, and wherein the first diameter is larger than the second diameter, and the second diameter is larger than the third diameter.

Also, each of the first cylindrical layer, the second cylindrical layer, and the third cylindrical layers has a step structure at an end of an outer surface thereof, respectively.

Also, a concave portion providing an accommodating space to contain the mounting portion is formed on the main frame, and a protruding portion having a structure in which one side adjacent to the mounting portion protrudes with a predetermined size of a step is formed on a partial area of the concave portion.

Meanwhile, a seat-library pairing system according to an embodiment of the present disclosure, being a seat-library pairing system providing a seat-library to a cheering stick, comprises a main frame; a cheering stick holder included in the main frame and on which the cheering stick is mounted; a terminal providing a seat-library to the cheering stick; and a mounting portion included in the main frame and on which the terminal is mounted.

Also, the cheering stick holder comprises a cheering stick pairing module that detects whether the cheering stick approaches and, when detecting the approach of the cheering stick, transmits data from the terminal to the cheering stick by communicating with the terminal and the cheering stick.

Also, a seat-library pairing system according to an embodiment of the present disclosure further comprises a tagging portion included in the main frame and tagged by a predetermined device.

Also, the terminal, based on user account information obtained by the tagging portion, transmits a predetermined seat-library to the mounted cheering stick.

Meanwhile, a seat-library pairing method according to an embodiment of the present disclosure, being a method by which an application executed by at least one processor of a seat-library pairing system performs a seat-library pairing service, comprises detecting ticket reservation information; extracting seat information from the detected ticket reservation information which includes a seat location in an auditorium; determining a seat-library which is matched with the extracted seat information; controlling pairing of a cheering stick to which the determined seat-library is to be stored; and controlling to transmit the seat-library to the paired cheering stick, wherein the cheering stick is mounted on a cheering stick holder including an insertion hole through which the cheering stick is inserted.

Also, the determining a seat-library which is matched with the extracted seat information comprises storing a plurality of seat-libraries, which are the data that allocates performance preparation data to each seat information, comparing the seat information of the plurality of seat-libraries with the extracted seat information, and determining a seat-library among the plurality of seat-libraries by detecting seat-library which is matched with the extracted seat information.

Also, the performance preparation data comprises at least one light emitting pattern, library data, and a scenario.

Also, the library data comprises an identification code for identifying each library and a light emitting pattern setting value comprising a value that pre-configured a constituting element of the light emitting pattern, and the scenario comprises an identification code for identifying each scenario and a library setting value which is a value that pre-configured an operation time of the library data.

Also, for the plurality of seat libraries, the identification codes for identifying the library and the scenario are the same, but the light emitting pattern setting value and the library setting value are defined differently for each seat information.

A seat-library pairing method and system using short-distance wireless communication according to an embodiment of the present disclosure controls a plurality of cheering sticks through a pre-stored seat-library, thereby directing a plurality of cheering sticks to present an orchestrated performance simultaneously.

Also, a seat-library pairing method and system using short-distance wireless communication according to an embodiment of the present disclosure stores a seat-library for the corresponding performance, thereby minimizing an error due to conflict with a seat-library of another performance.

Also, a seat-library pairing method and system using short-distance wireless communication according to an embodiment of the present disclosure enables the pairing of a cheering stick and a kiosk through an intuitive user experience and reduces the time and inconvenience involved to store a seat-library, thereby improving user convenience.

While a library pairing service is provided, a terminal providing a seat-library pairing service and a cheering stick are mounted securely on a pedestal on which the terminal is mounted so that a user of the cheering stick may efficiently receive a library pairing service.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 3A and FIG. 3B illustrate information contained in performance preparation data according to an embodiment of the present disclosure.

DESCRIPTION OF EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the specification, the same or corresponding constituting element is assigned the same reference number, and repeated descriptions thereof will be omitted.

Figure 1:
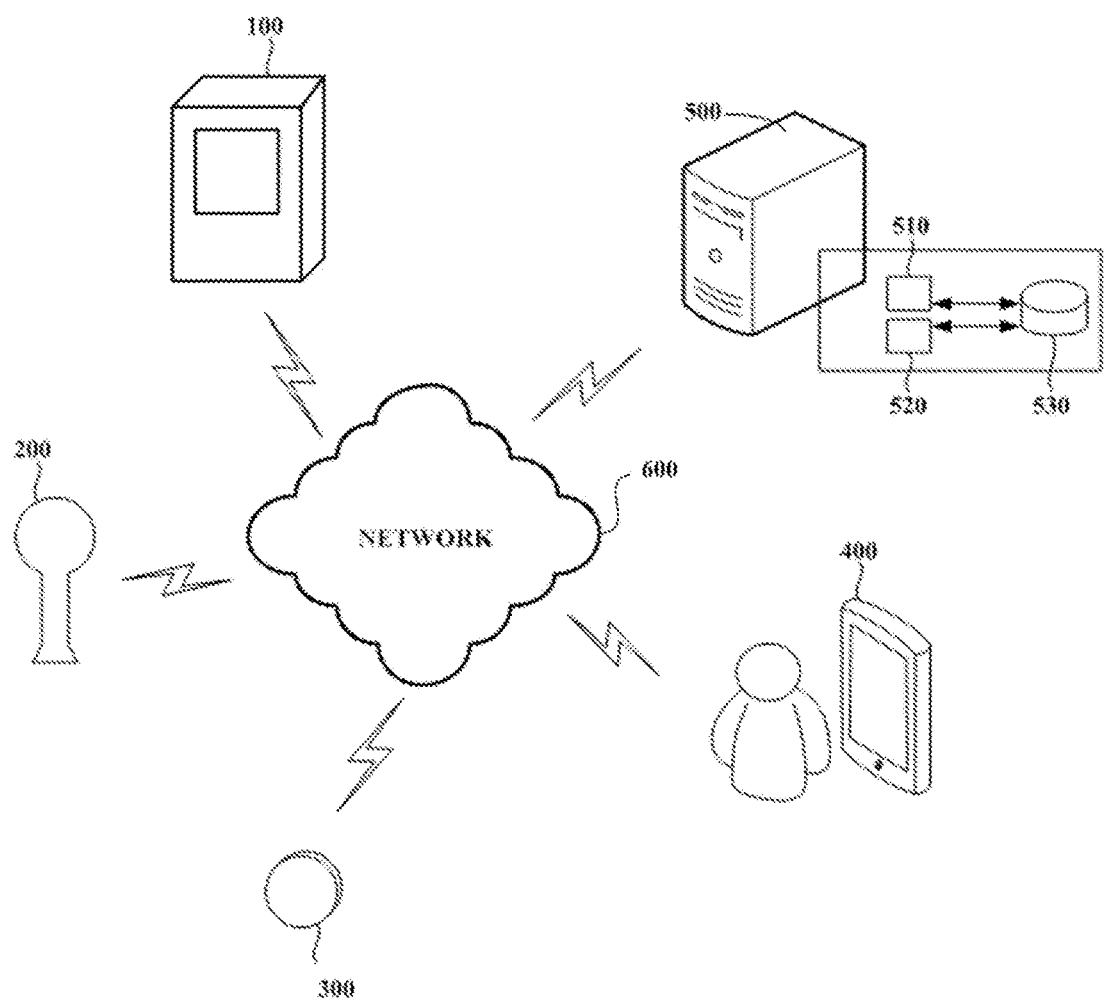
FIG. 1 is a conceptual drawing of a seat-library pairing system using short-distance wireless communication according to an embodiment of the present disclosure.

FIG. 1 is a conceptual drawing of a seat-library pairing system using short-distance wireless communication according to an embodiment of the present disclosure.

Referring to FIG. 1, a seat-library pairing system (in what follows, a library pairing system) using short-distance wireless communication according to an embodiment of the present disclosure may provide a service for pairing a seat-library, which is data to be stored before a performance, with a cheering stick to perform orchestrated direction of various scenarios through a plurality of cheering sticks at different locations in an auditorium.

The library pairing service may refer to a service that connects and interoperates programs in machine code designed and compiled to perform a specific function for transmission and reception between devices. According to an embodiment, library pairing means connection and interoperation using short-distance wireless communication to transmit, to each of a plurality of cheering sticks from a kiosk, a seat-library for controlling the plurality of cheering sticks in a light emitting pattern according to the orchestrated direction.

In an embodiment, the library pairing system that provides the above library pairing service may include a kiosk 100, a cheering stick 200, an account authentication device 300, a user device 400, a performance management server 500, and a network 600.

The kiosk 100 may be paired with the cheering stick 200 and provide a seat-library matching the seat where the cheering stick 200 is to be located. The kiosk 100 may be an unmanned information terminal installed in or around an auditorium where performance is played.

The cheering stick 200 means a small cheering tool that may emit light in various forms in a sports arena or a concert hall and may operate in various light emitting patterns according to a seat-library.

The account authentication device 300 means a device including the user account information of a user who owns the cheering stick 200 within a platform performing the performance direction of the cheering stick 200 and may perform the function of authenticating the user's account in a sales machine such as the kiosk 100, a ticket authentication device, or a goods vending machine through remote communication.

At this time, the user account information means the information which is related to the user's personal information provided based on the consent to provide personal information when the user subscribes to and manages a predetermined platform and service (e.g., Weverse), may include the user's name, date of birth, mobile phone number, email, and platform/service ID.

The user device 400 means a terminal such as a smartphone of a user who owns the cheering stick 200 and the account authentication device 300, and may individually control the cheering stick 200 carried by the user or check and manage the seat-library pairing state of the cheering stick 200, the user account information or performance-related ticket reservation information linked to the account authentication device 300.

The performance management server 500 refers to a computer system that provides information related to a performance and carries out a task. For example, the performance management server 500 may manage ticket reservation information matched to the user account and provide a seat-library matching each seat to the cheering stick 200 through the kiosk 100.

At this time, the ticket reservation information refers to the user's personal information provided when the user visits a predetermined ticket reservation site (e.g., Interpark® and YES24®) to purchase a ticket for viewing a performance and information about the ticket that the user has purchased, which may include at least one or more of the name and date of birth of a person who has purchased the ticket, ticket site ID, mobile phone number, the performance name, performance date and time, performance location, reservation number, number of advance purchase tickets, and seat information.

Also, seat information included in the ticket reservation information may contain the seat number of a seat to be seated by the user among the information related to the ticket of a performance that the user wants to watch. For example, the seat information may be in the form of "Seat F, third row, section A on the first floor."

The kiosk 100, the cheering stick 200, the account authentication device 300, the user device 400, and the performance management server 500 may be connected through the network 10.

Here, the network 10 according to the embodiment refers to a connection structure in which individual nodes such as the kiosk 100, the cheering stick 200, the account authentication device 300, the user device 400, and the performance management server 500 may exchange information with each other; one example of the network 600 may include a 3rd Generation Partnership Project (3GPP) network, a Long Term Evolution (LTE) network, a World Interoperability for Microwave Access (WiMAX) network, the Internet, a Local Area Network (LAN), a Wireless Local Area Network (LAN), a Wide Area Network (WAN), a Personal Area Network (PAN), a Bluetooth network, a satellite broadcasting network, an analog broadcasting network, and a Digital Multimedia Broadcasting (DMB) network but is not limited thereto.

In what follows, the kiosk 100, the cheering stick 200, the account authentication device 300, the user device 400, and the performance management server 500 implementing the library pairing system will be described in detail with reference to appended drawings.

Kiosk 100

The kiosk 100 according to an embodiment of the present disclosure may be a predetermined computing device providing a library pairing service.

A predetermined computing device providing a library pairing service according to an embodiment of the present disclosure is described based on the assumption that the device is implemented by the kiosk 100, but it is also possible to implement the device using a mobile-type computing device and/or a desktop-type computing device and peripheral devices linked thereto.

Also, according to an embodiment, the kiosk 100 may further include a predetermined server computing device that provides a library pairing service environment.

Figure 2:
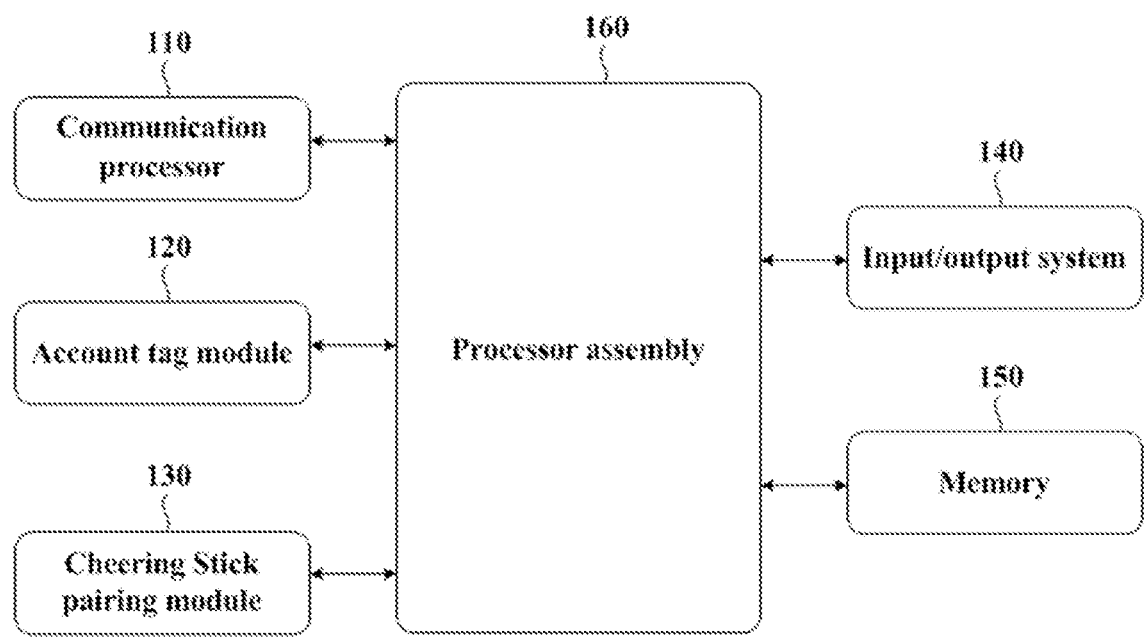
FIG. 2 is an internal block diagram of a kiosk according to an embodiment of the present disclosure.

FIG. 2 is an internal block diagram of a kiosk according to an embodiment of the present disclosure.

Meanwhile, referring to FIG. 2, from a functional point of view, the kiosk 100 may include a communication processor 110, an account tag module 120, a cheering stick pairing module 130, an input/output system 140, a memory 150, and a processor assembly 160.

The communication processor 110 may include one or more devices for communicating with an external device. The communication processor 110 may communicate through a wireless or wired network with the external device.

Specifically, the communication processor 110 may communicate with the performance management server 500 that stores a content source for providing a library pairing service and communicate with various user input components, such as a controller that receives a user input.

In an embodiment, the communication processor 110 may transmit and receive various data related to the library pairing service to and from another terminal and/or an external server.

The communication processor 110 may transmit and receive data wirelessly to and from at least one of a base station, an external terminal, and an arbitrary server on a mobile communication network built through a communication device capable of performing technology standards or communication methods (for example, Long Term Evolution (LTE), Long Term Evolution-Advanced (LTE-A), 5G New Radio (NR), and WiFi) for mobile communication; or communicate through a wired connection.

Specifically, the communication processor 110 according to an embodiment may transmit the user account information and receive the ticket reservation information matched to the user account and a seat-library in regard to a seat to be seated in the performance from the performance management server 500.

In other words, since the kiosk 100 including the communication processor 110 is implemented as an online-type device and provides the user account information and the seat-library through the performance management server 500 only at the request of the user, the risk of personal information leakage is reduced, and thereby achieving an advantageous effect of protecting the user's personal information.

The account tag module 120 may include a first short-distance communication processor for detecting a tagged device. Here, tagging may mean that the account authentication device 300 approaches the account tag module 120 within a predetermined distance.

Specifically, the account tag module 120 may detect whether a tagged device (in the embodiment, the account authentication device 300) is approached and, upon detection, communicate with the device using short-distance communication to obtain information stored in the device. For example, the account tag module 120 may include a communication chip that performs short-distance communication through Radio Frequency Identification (RFID), Near Field Communication (NFC), Magnetic Secure Transmission (MST), Near Field Magnetic Induction (NFMI), or Bluetooth communication.

In what follows, descriptions will be given based on the account tag module 120, which performs short-distance communication through NFC. However, short-distance communication with a predetermined device may be implemented by various embodiments including communication in contact and/or non-contact manner (e.g., an RFID device transmitting and receiving an RF signal) as well as NFC; thus, the present disclosure is not limited to the example to be described later.

In the embodiment, the account tag module 120 may be an NFC reader (e.g., an NFC tag pad) that performs an NFC function.

Also, the account tag module 120 may transmit and receive various data related to the library pairing service to and from an external device based on the NFC function.

The account tag module 120 may transmit and receive data to and from an external device based on media employing a communication protocol defined in the ISO/IEC 18092 (or ECMA-340 or NFCIC-1) and the ISO/IEC 21481 (or ECMA-352 or NFCIC-2), which are the NFC international commercial specifications, specifically, based on the ISO/IEC 14443 (proximity card), the ISO/IEC 15693 (vicinity card), JIS: X6319 (FeliCa), or MIFARE.

In the embodiment, when recognizing that the account authentication device 300 is located within a predetermined distance, the account tag module 120 may obtain user account information by performing short-distance communication with the account authentication device 300.

The cheering stick pairing module 130 may include a second short-distance communication processor for detecting a tagged device.

Specifically, the cheering stick pairing module 130 detects whether a tagged, mounted, or settled device (in the embodiment, the cheering stick 200) approaches and communicates with the device upon detection of the approach to transmit and receive data. For example, the cheering stick pairing module 130 may include a communication chip that performs short-distance communication through, for example, Radio Frequency Identification (RFID), Near Field Communication (NFC), Magnetic Secure Transmission (MST), Near Field Magnetic Induction, or Bluetooth communication.

Also, the cheering stick pairing module 130 may transmit and receive various data related to a library pairing service to and from an external device based on short-distance communication.

In the embodiment, when recognizing that the cheering stick 200 is located within a predetermined distance, the cheering stick pairing module 130 performs short-distance communication with the cheering stick 200 to transmit and receive various data for receiving a seat-library.

In the hardware structure, the cheering stick pairing module 130 may include a predetermined supporting member to securely fix the cheering stick 200 located within a predetermined distance.

For example, a predetermined supporting member may be implemented in a pedestal type that mounts the cheering stick 200, a pad type on which the cheering stick 200 is placed, or a box type having an internal space for accommodating the cheering stick 200.

The input/output system 140 may include a sensor system, an input system, and a display system.

The sensor system may include at least one of an image sensor, a position sensor, an audio sensor, a distance sensor, a proximity sensor, and a contact sensor.

Here, the image sensor 141 may capture an image and/or a video of the surrounding physical space of the kiosk 100.

In the embodiment, the image sensor 141 may acquire an image related to a library pairing service (e.g., a ticket image).

Also, the image sensor 141 is disposed on the front or/and rear surface of the kiosk 100 to obtain an image by photographing a scene in the disposed direction, and a camera disposed toward the outside of the kiosk 100 may photograph a paper-type ticket.

The image sensor 141 may include an image sensor device and an image processing module. Specifically, the image sensor 141 may process a still image or a moving image obtained by the image sensor device (e.g., CMOS or CCD).

Also, the image sensor 141 may extract necessary information by processing a still image or a moving image obtained through the image sensor device using the image processing module (e.g., an OCR device) and send the extracted information to the processor.

The image sensor 141 may be a camera assembly including at least one or more cameras.

Also, depending on embodiments, the image sensor 141 may operate by being included in the kiosk or may operate in conjunction with the communication processor 110 by being included in an external device (e.g., an external server).

The audio sensor may recognize a sound around the kiosk 100.

Specifically, the audio sensor may include a microphone capable of recognizing a voice input of a user who uses the kiosk 100.

In the embodiment, the audio sensor may receive voice data required for a library pairing service from the user.

In the embodiment, the kiosk 100 may include a speaker to output voice data input through the audio sensor.

The input system may recognize a user input related the library pairing service (e.g., a gesture, a voice command, a button operation, or other types of inputs).

Specifically, the input system may include a predetermined button, a touch sensor, and/or an image sensor 141 for receiving a user motion input.

Also, the input system may be connected to an external controller to receive a user's input.

The display system may output various information related to the library pairing service as a graphic image and detect a user's touch input for library pairing.

In the embodiment, the display system may display a user interface (UI), library pairing content, and/or content management system (CMS: Content Management System) based data.

The display system may include at least one of a liquid crystal display (LCD), a thin film transistor-liquid crystal display (TFT LCD), an organic light-emitting diode (OLED), a flexible display, a three-dimensional (3D) display, and an e-ink display.

The constituting elements above may be disposed within the housing of the kiosk 100, and the user interface may include a touch sensor 145 on the display 143 configured to receive a user touch input.

Specifically, the display system may include a display 143 that outputs an image and a touch sensor 145 that detects a user's touch input.

For example, the display 143 may be implemented as a touch screen by forming a layer structure or by being integrated with the touch sensor 145. The touch screen may not only function as a user input unit providing an input interface between the kiosk 100 and the user but also provide an output interface between the kiosk 100 and the user.

The memory 150 may store one or more of various application programs, data, and commands for providing a library pairing service environment.

In the embodiment, the memory 150 may store an application including a command for controlling the kiosk 100.

Also, the memory 150 may include a program area and a data area.

Here, the program area according to the embodiment may be linked between an operating system (OS) for booting the kiosk 100 and functional elements, and the data area may store data generated according to the use of the kiosk 100.

Also, the memory 150 may include at least one or more non-volatile computer-readable storage media and volatile computer-readable storage media.

For example, the memory 150 may be one of various storage devices, such as a ROM, an EPROM, a flash drive, and a hard drive; and may include a web storage performing a storage function of the memory 150 on the Internet.

In the embodiment, the memory 150 may pre-store information necessary to perform a library pairing service.

Specifically, in the embodiment, the memory 150 may pre-store user account information, ticket reservation information, seat information, and performance preparation data to perform a library pairing service.

The performance preparation data means data that pre-defines various light emitting patterns to be emitted by the cheering stick 200 at the seat where the cheering stick 200 is to be located to play a unified performance.

The performance preparation data have to be stored in the cheering stick 200 in advance before the start of a performance, and since the cheering sticks 200 are placed at different seats, different performance preparation data may be stored according to the seat information.

Also, in the embodiment, the performance preparation data may include a light emitting pattern, a library, and a scenario.

FIG. 3A and FIG. 3B illustrate information contained in performance preparation data according to an embodiment of the present disclosure.

Referring to FIG. 3A and FIG. 3B, the performance preparation data 1000 according to the embodiment may include a plurality of libraries 1010 to 1030. Specifically, FIG. 3A shows an example of a library included in the performance preparation data, and FIG. 3B shows an example of library setting values included in the performance preparation data.

The light emitting pattern refers to a light emission form in which a cheering stick 200 operates according to constituting elements including the light turning-on/off state (e.g., On/Off), color, and brightness.

The light emitting pattern may also include a light emission effect obtained by setting the constituting elements to change within a predetermined time and generating a dynamic visual effect as a constituting element.

For example, the light emission effect may include 1) a blink effect obtained by setting light emission within a predetermined time differently for each time period and quickly flashing the cheering stick, 2) a gradation effect obtained by setting a light color within a predetermined time differently for each time period and gradually changing the emitted light color, and 3) a fade in/out effect obtained by setting the brightness differently for each time period and gradually decreasing or increasing the brightness.

The library refers to the data preconfiguring the light emitting pattern of the cheering stick 200 and may include an identification number and constituting element setting values (in what follows, light emitting pattern setting values) for a light emitting pattern.

For example, the color included in the light emitting pattern setting value may be set by a hexadecimal code representing an RGB color, and the brightness included in the light emitting pattern setting value may be set by a brightness value ranging from 0 to 100, where the higher the brightness value, the brighter the emitted light.

For example, a first library 1010 may mean data set with an identification number 0001 for identifying the first library 1010, light emission ON, a first color, first brightness, and a first light emission effect.

Referring to the example shown in FIG. 3A, the first library 1010 may be a binary array indicating a light emitting pattern setting value of (0001/ON/255, 0, 0/50, Blink). Also, a third library 1030 may be a binary array indicating a light emitting pattern setting value of (0003/ON/0, 255/10/Grad). Meanwhile, since the light emission is OFF for the case of a second library 1020, the light emitting pattern setting values corresponding to color, brightness, and light emission effect may not be set.

In other words, when a control signal to execute the first library 1010 is sent to the cheering stick 200 storing a plurality of libraries 1010 to 1030 in an auditorium, the cheering stick 200 may emit light with a first light emission effect comprising a first color, which is red corresponding to 255, 0, 0, first brightness corresponding to the level of 50, and a first light emission effect, which is a blink effect corresponding to twinkling light.

The scenario is the data for setting the operation time (in what follows, a library setting value) of at least one or more libraries for a predetermined time and operating the cheering stick 200 by changing the light emitting pattern of the cheering stick 200 for a pre-configured time, where the data may include a scenario identification number for identifying each scenario.

The scenario may correspond to, for example, a single song. In other words, the operation time of one scenario is the same as the playback time of one song, so that while the song is played, the cheering stick 200 may operate by changing the light emitting pattern according to the library setting value.

For example, a first scenario 1100 may be the data defined to have an identification number 001 and operate as a first library for 5 seconds, then operate as a second library for 3 seconds, and then operate as a third library for 2 seconds.

Referring again to FIG. 3B, the performance preparation data 1000 according to the embodiment may include a plurality of scenarios 1100, 1200.

Specifically, referring to the example shown in FIG. 3B, the first scenario 1100 may include a library setting value of (001, 0001-5 sec/0002-3 sec/0003-2 sec). Also, the second scenario 1200 may include a library setting value of (002, 0005-8 sec/0002-30 sec/0003-14 sec).

In other words, when a control signal with a low amount of data instructing to operate the first scenario 1100 in an auditorium is sent to the cheering stick 200 storing a plurality of scenarios 1100, 1200, the cheering stick 200 may operate using a first light emitting pattern according to the first library 1010 for 5 seconds, using a second light emitting pattern according to the second library 1020 for 3 seconds, and using a third light emitting pattern according to the third library 1030 for 2 seconds.

Since the libraries and the scenarios have the same identification numbers but have different light emitting pattern setting values and library setting values for the seats where cheering sticks 200 are to be placed, the cheering sticks 200 may emit light differently according to their setting values.

Specifically, for example, although the first cheering stick disposed on the first seat and the second cheering stick disposed on the second seat may store the first library 1010 having the same identification number 0001, the light emitting pattern setting values set in the first library 1010 may be different from each other.

For example, the first library may include a first seat-first library which is a first library for the first seat, and a second seat-first library to an n-th seat-first library.

At this time, the first seat-first library to the nth seat-first library may be defined to have the respective light emission setting values so that the cheering sticks arranged in the first to n-th seats exhibit a specific shape when viewed as a whole and fulfill a unified performance direction. Therefore, as long as a performance director directs to operate the first library, the cheering stick at each seat may read the first library stored in the corresponding seat and operate according to the light emitting pattern setting value, thereby performing a unified performance direction.

In the same way, although the first cheering stick disposed on the first seat and the second cheering stick disposed on the second seat may store the first scenario 1100 having the same identification number 001, the library setting values set in the first scenario 1100 may be different from each other.

In other words, by controlling the cheering sticks 200 disposed at the respective seats to operate simultaneously but emit light in different light emitting patterns using the first library and the first scenario having different setting values for the respective seats, the performance manager may fulfill a performance direction such that the cheering sticks may exhibit a specific shape or pattern when viewed from a location away from the audience.

Returning again, the performance preparation data may be mapped to each seat to produce a different light emitting pattern for each seat and stored in the memory 150 to meet the number of seats. In other words, each seat and performance preparation data may be implemented in the form of a mapping table; however, the present disclosure is not limited to the specific table form. Depending on the embodiments, the performance preparation data may be generated by grouping the seats to be operated according to a common light emitting pattern and defining a light emission setting value for each group.

Accordingly, the cheering stick 200 has to store in advance the performance preparation data corresponding to each seat to be disposed when a performance is played, and the kiosk 100 may guide the process to users by providing a library pairing service. More details on the operation above will be provided later.

In what follows, the performance preparation data 1000 corresponding to a seat on which the cheering stick 200 is to be placed will be referred to as a seat-library.

In the embodiment, the kiosk 100 including a memory 150 for storing a plurality of data described above for performing a library pairing service may be implemented as an offline-type device. Since the offline-type kiosk 100 pre-stores and maintains user-related information, it is possible to reduce the cost of building a communication function of the kiosk 100 and install the kiosk 100 in such a place where the communication infrastructure is not readily available; therefore, it has the effect of expanding the area where the kiosk may be used.

The processor assembly 160 may include at least one or more processors capable of executing instructions of an application stored in the memory 150 to perform various tasks for creating a library pairing service environment.

In the embodiment, the processor assembly 160 may control the overall operation of the constituting elements through the application of the memory 150 to provide a library pairing service.

The processor assembly 160 may be a system-on-a-chip (SOC) suitable for the kiosk 100, including a central processing unit (CPU) and/or a graphics processing unit (GPU), may execute the operating system (OS) and/or an application program stored in the memory 150, and control the individual constituting elements installed in the kiosk 100.

Also, the processor assembly 160 may communicate with each constituting element internally through a system bus and may include one or more predetermined bus structures including a local bus.

Also, the processor assembly 160 may be implemented by using at least one of application-specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

In the embodiment, the processor assembly 160 may recognize the account authentication device 300 and the cheering stick 200 using short-distance wireless communication based on the account tag module 120 and the cheering stick pairing module 130.

Also, in the embodiment, the processor assembly 160 may obtain user account information included in the recognized account authentication device 300 based on the communication processor 110.

Also, in the embodiment, the processor assembly 160 may detect ticket reservation information matched to the obtained user account information.

Also, in the embodiment, the processor assembly 160 may extract seat information included in the detected ticket reservation information.

Also, in the embodiment, the processor assembly 160 may determine the seat-library according to the extracted seat information.

Also, in the embodiment, the processor assembly 160 may pair the cheering stick 200 to which the determined seat-library is to be transmitted.

Also, in the embodiment, the processor assembly 160 may transmit the determined seat-library to the paired cheering stick 200.

In other words, in the embodiment, the processor assembly 160 performing the steps above may process the overall process for providing a seat-library to a user's seat by pairing the kiosk 100 with the user's cheering stick 200.

Also, depending on the embodiments, the kiosk 100 may further perform at least part of the functional operations executed in the performance management server 500 to be described later.

The kiosk 100 supporting the plurality of configurations may be implemented as an integrated-type or a separable-type in terms of a hardware structure.

Figure 4:
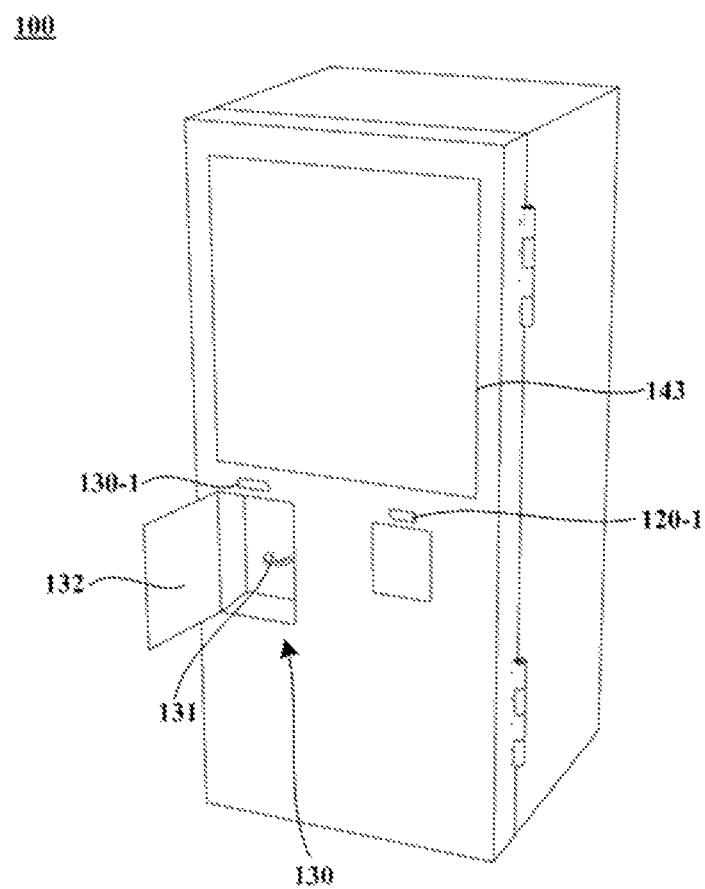
FIG. 4, FIG. 5, and FIG. 6 are examples of kiosks according to various embodiments of the present disclosure.
Figure 5:
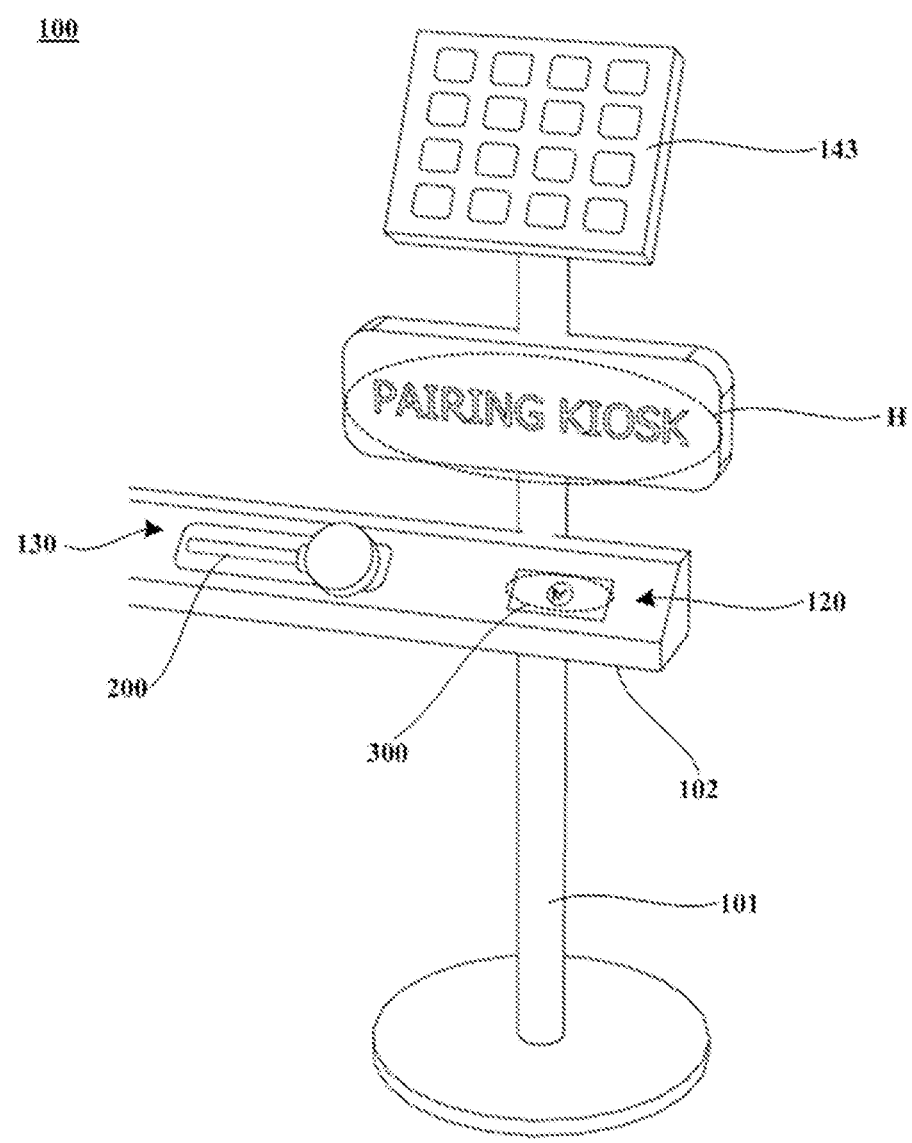
Figure 6:
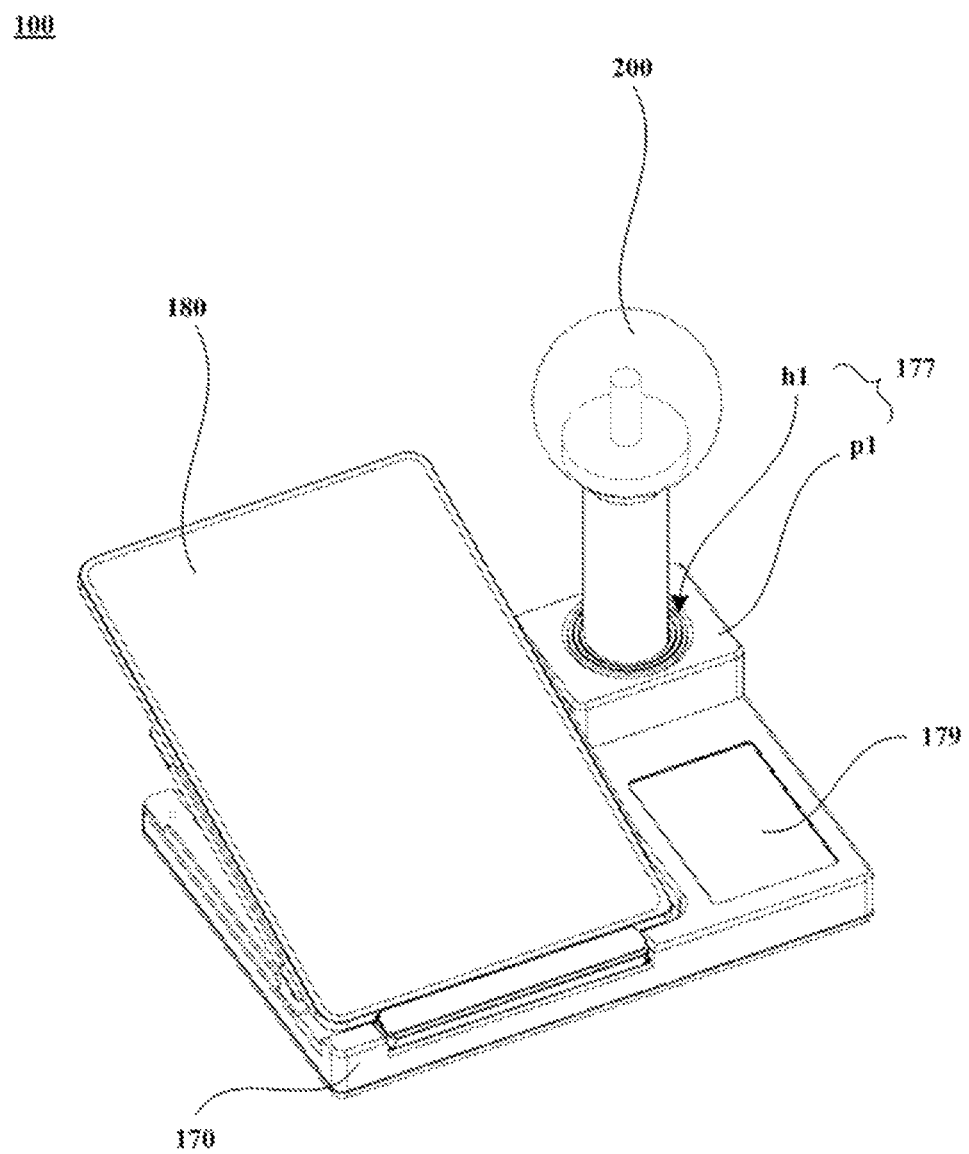

FIGS. 4 to 6 are examples of kiosks according to various embodiments of the present disclosure.

FIG. 4 shows an integrated-type kiosk in which the account tag module 120 and the cheering stick pairing module 130 are installed in the housing of the kiosk 100, FIG. 5 shows a separable-type kiosk in which the account tag module 120 and the cheering stick pairing module 130 are installed separately from the housing, and FIG. 6 shows a pedestal-type kiosk built on a predetermined structure in which a mobile-type computing device and a cheering stick 200 may be mounted.

Referring to FIG. 4, when the kiosk 100 is an integrated-type device according to the embodiment, the kiosk 100 may include the account tag module 120 and the cheering stick pairing module 130 within the housing.

At this time, the account tag module 120 and the cheering stick pairing module 130 may be installed at such a location where the user may mount the cheering stick 200 or tag the account authentication device 300 easily.

For example, as shown in FIG. 4, the account tag module 120 and the cheering stick pairing module 130 may be installed on one side of the lower end of the display 143.

Also, in the embodiment, the account tag module 120 may be installed on the outer surface of the kiosk 100 in the form of a pad that may tag the account authentication device 300.

Also, in the embodiment, the cheering stick pairing module 130 may be installed in the form of a box containing a space therein to accommodate and mount the cheering stick 200.

Also, in the embodiment, the cheering stick pairing module 130 may include a predetermined fixing portion 131 installed in the inner space to fix the cheering stick 200 accommodated therein or include a cover 132 for preventing the cheering stick 200 accommodated therein from being fallen out and blocking radio waves.

Also, the account tag module 120 and the cheering stick pairing module 130 may further include a first LED module 120-1 and a second LED module 130-1 notifying that the plurality of modules has normally recognized a predetermined device (e.g., the cheering stick 200 and the account authentication device 300).

Specifically, in the embodiment, the kiosk 100 may operate the first LED module 120-1 when the account authentication device 300 is normally recognized by the account tag module 120.

Also, in the embodiment, the kiosk 100 may operate the second LED module 130-1 when the cheering stick 200 is normally recognized by and mounted on the cheering stick pairing module 130.

Also, the second LED module 130-1 may operate even after predetermined data has been transmitted to the cheering stick 200. In this case, the cheering stick pairing module 130 may open the cover 132 to provide the cheering stick 200 to the user at the same time the second LED module 130-1 is operated.

The integrated-type kiosk 100 does not require an additional device in addition to the kiosk 100 itself, thereby increasing the convenience of installation.

Meanwhile, referring to FIG. 5, when the kiosk 100 is a separable-type kiosk according to another embodiment, the display 143, the account tag module 120, and the cheering stick pairing module 130 may be installed separately from the housing H of the kiosk 100.

At this time, the constituting elements of the kiosk 100 except for the account tag module 120 and the cheering stick pairing module 130 may be disposed in the housing (H).

Also, in another embodiment, the kiosk 100 may further include a predetermined structure (e.g., a support 101 and a shelf 102) for individually installing the display 143, the account tag module 120, and the cheering stick pairing module 130.

Specifically, in another embodiment, a support 101 for fixing the display 143 to a position separated by a predetermined height from the ground and a shelf 102 for mounting the cheering stick pairing module 130 may be further installed in the kiosk 100.

The display 143 may be positioned at the upper portion of the support 101, and the housing H may be positioned on one side of the support 101.

Also, as shown in FIG. 5, the shelf 102 may be installed by being included in one side of the support 101 or may be installed in a form such as a desk separated from the support 101.

Also, the shelf 102 may have a structure parallel to the ground to maintain the mounted state of the account tag module 120 in the process of pairing, the account authentication device 300 mounted in the cheering stick pairing module 130, and the cheering stick 200.

The separable-type kiosk 100 may operate the display 143 while the cheering stick 200 and the account authentication device 300 are mounted, thereby improving the user's convenience in operating the device.

The embodiments including the integrated-type and/or separable-type kiosk 100 have been described based on the assumption that the kiosk type is determined according to whether the housing H of the kiosk 100 is separated from predetermined constituting elements.

In what follows, the kiosk 100 may be referred to as a device comprising a terminal providing a seat-library to a predetermined cheering stick and a pedestal on which the terminal is mounted, regardless of whether the housing H is separated from predetermined constituting elements.

Figure 7:
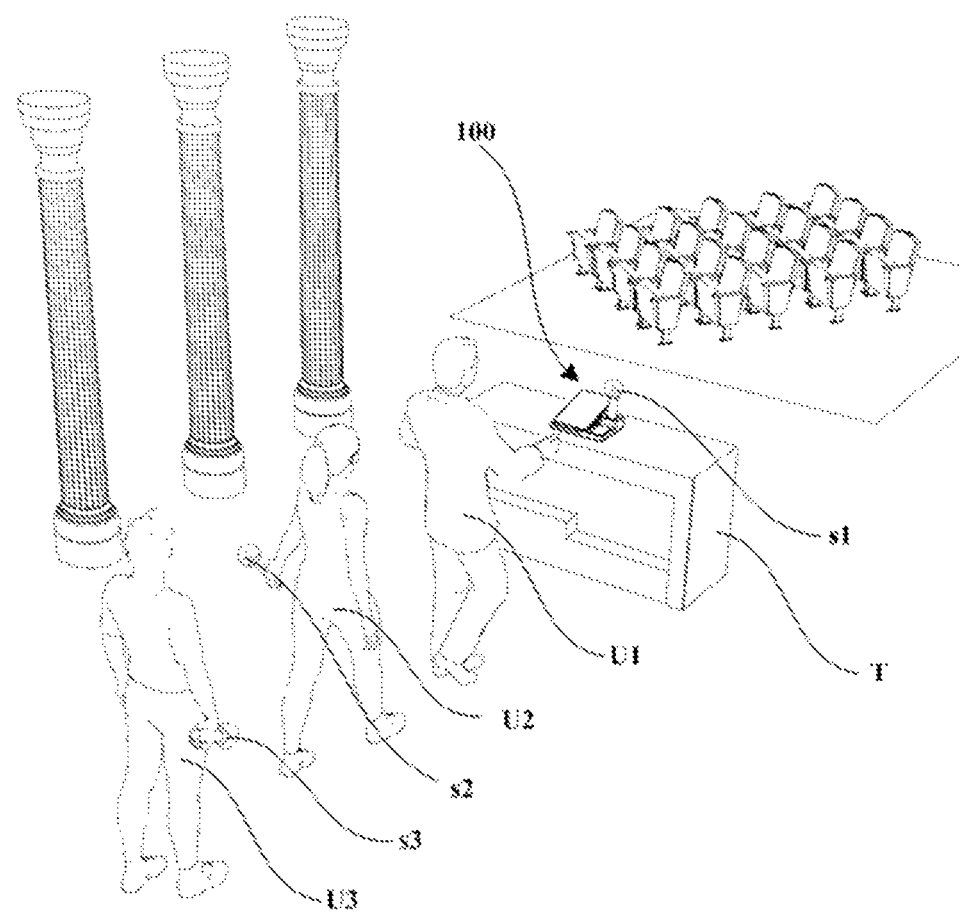
FIG. 7 is an example of using a pedestal-type kiosk according to another embodiment of the present disclosure.

Meanwhile, FIG. 6 shows one example in which a cheering stick is mounted on a pedestal-type kiosk according to another embodiment of the present disclosure, FIG. 7 shows a case in which users use the pedestal-type kiosk, and FIGS. 8 to 14 are drawings for illustrating constituting elements of a pedestal-type kiosk according to yet another embodiment of the present disclosure.

According to another embodiment, when the kiosk 100 is a pedestal-type kiosk, it may be implemented in the form of a pedestal on which a mobile-type computing device is mounted. In what follows, for the convenience of description, the mobile-type computing device is implemented as a tablet, but the present disclosure is not limited to the specific example. Also, in what follows, the tablet may be referred to as a terminal 180.

Referring to FIG. 6, in another embodiment, the kiosk 100 may include a pedestal 170 including a terminal 180, a cheering stick holder 177, and a tagging portion 179.

At this time, the terminal 180 may be mounted on one side of the pedestal 170, and the mounted terminal 180 may be detachable.

Also, a cheering stick holder 177 having a structure into which the cheering stick 200 is inserted may be provided on one side of the pedestal 170.

At this time, the cheering stick holder 177 may include an insertion hole h1 and a first protruding portion p1. The insertion hole h1 may be a hollow having a cylindrical shape to match the shape of the lower handle portion of the cheering stick 200 to be inserted; the first protruding portion p1 includes the insertion hole h1 and may have a protruding structure forming a step of a predetermined size.

Also, a cylindrical layer of a predetermined size may be inserted into the insertion hole h1 to adapt to the cheering stick 200 having a different diameter, and descriptions of the cylindrical layer will be given later.

Also, the first protruding portion p1 may protrude in an upward direction by a predetermined length from the first surface of the pedestal on which the tagging portion 179 is disposed. At this time, the predetermined length may be at least as long as the first protruding portion p1 securely supports the cheering stick 200 to be inserted (e.g., ⅓ or more of the length of the handle of the cheering stick 200).

Also, one side of the pedestal 170 may have a tagging portion 179, a predetermined area in which a predetermined device is disposed. For example, the tagging portion 179 may be provided in a predetermined area different from the area in which the cheering stick holder 177 is provided.

Also, although not shown in FIG. 6, the cheering stick pairing module 130 may be included on one inner side of the cheering stick holder 177, and the account tag module 120 may be included on one inner side of the tagging portion 179. Accordingly, in another embodiment, the kiosk 100 may perform short-distance communication with the cheering stick 200 mounted on the cheering stick holder 177 and/or the account authentication device 300 tagged by the tagging portion 179.

In other words, as shown in FIG. 7, the pedestal-type kiosk 100 may be installed together with a predetermined structure (e.g., table T) inside or near the auditorium; thus, at least one or more users U1, U2, U3 may mount the cheering stick s1, s2, s3 carried by the user into the cheering stick holder 177 and operate the terminal 180 mounted in advance on the pedestal 170 to download a predetermined seat-library to the cheering stick 200.

Figure 8:
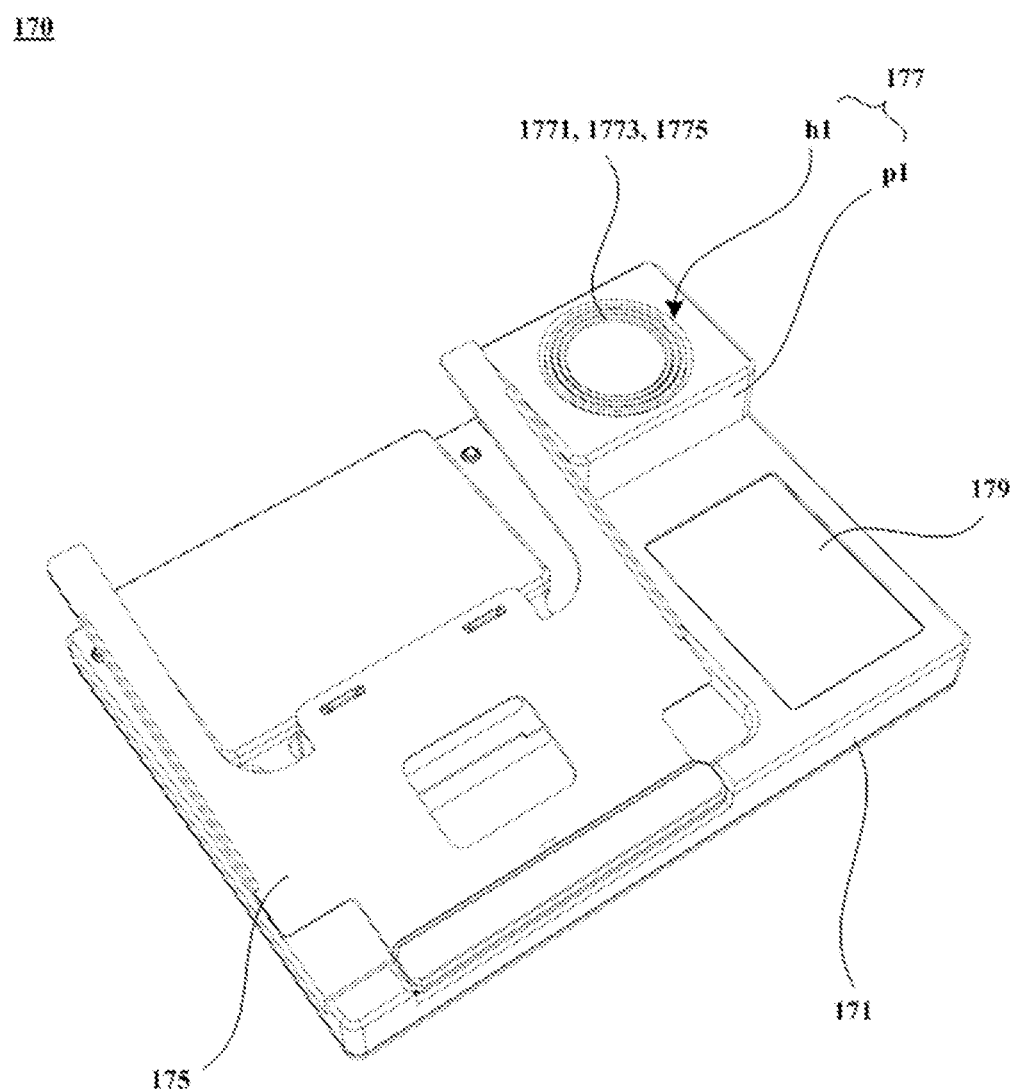
FIG. 8, FIG. 9, FIG. 10, FIG. 11, FIG. 12, FIG. 13, and FIG. 14 are drawings for illustrating constituting elements of a pedestal-type kiosk according to yet another embodiment of the present disclosure.

Referring to FIG. 8, in another embodiment, the pedestal 170 may include a main frame 171, a mounting portion 175, a cheering stick holder 177 including a cylindrical layer 1771, 1773, 1775, and/or a tagging portion 179.

The main frame 171 may mean the entire frame including at least one or more structures on which the terminal 180 and the cheering stick 200 may be mounted.

Also, the main frame 171 may be implemented in a rectangular-shaped flat structure having a horizontal length longer than a vertical length.

Also, a mounting portion 175 for mounting the terminal 180 may be disposed on one side of the main frame 171.

Figure 9:
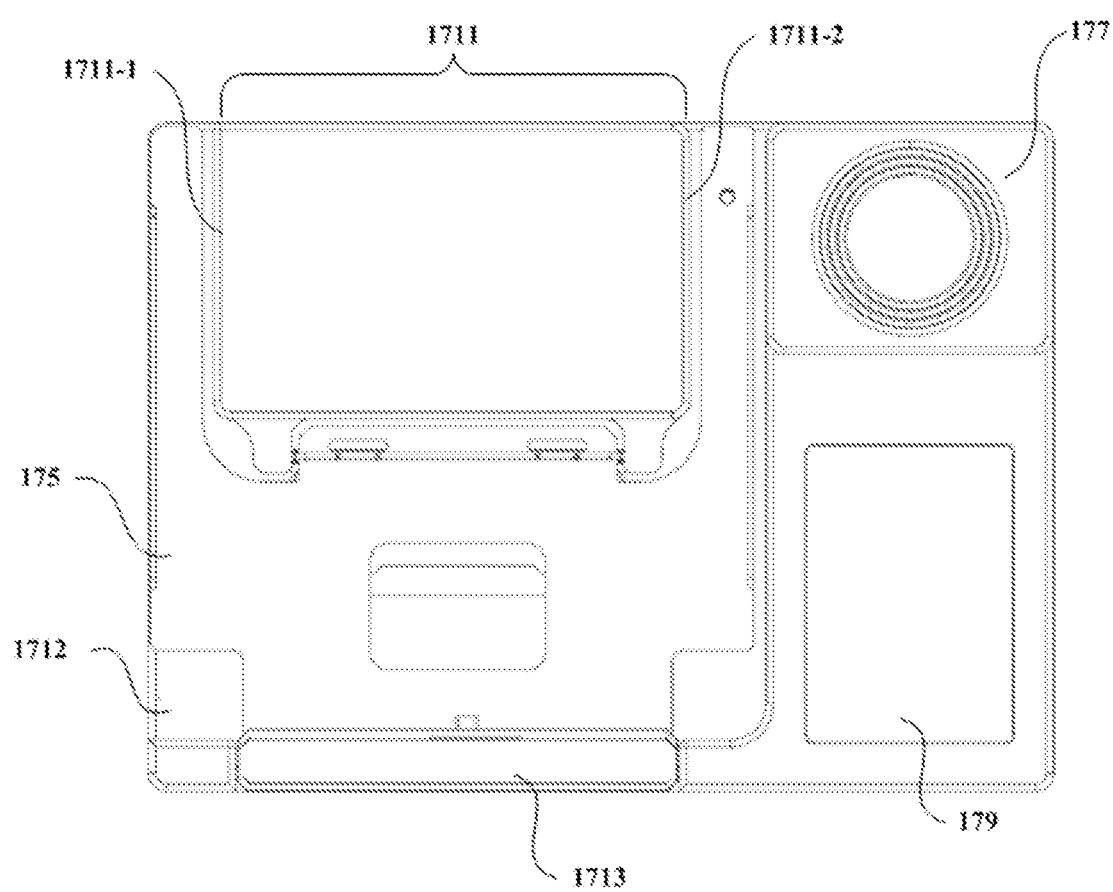

Referring to FIG. 9, the main frame 171 may include a second protruding portion 1711, a concave portion 1712, a hinge portion 1713, and/or a tagging portion 179.

The hinge portion 1713 may be a device for connecting the main frame 171 and the mounting portion 175 by being coupled to one side of the lower end of the mounting portion 175 and rotating the mounting portion 175.

To this end, the hinge portion 1713 may include a predetermined hinge to connect the main frame 171 and the mounting portion 175.

Accordingly, while the main frame 171 is fixed, the mounting portion 175 may rotate up and down within a predetermined angular distance with the hinge portion 1713 as a reference axis.

The second protruding portion 1711 may have a protruding structure forming a step of a predetermined size on one side adjacent to the mounting portion 175 rotated downward.

At this time, the protruded direction of the second protruding portion 1711 may be directed toward the upper surface of the main frame 171.

Also, both ends 1711-1, 1711-2 of the second protruding portion 1711 may be the portions contacted when the mounting portion 175 is rotated downward.

The second protruding portion 1711 may be so built to protect the mounting portion 175, which has an easily deformable shape, against deformation from an external impact when the mounting portion 175 is rotated downward.

The concave portion 1712 may provide an accommodation space for containing the downward-rotated mounting portion 175 on the main frame 171.

The second protruding portion 1711 may be included on a partial region of the concave portion 1712. In other words, the second protruding portion 1711 and the concave portion 1712 may match the shape of the mounting portion 175 when the mounting portion 1715 is rotated downward.

Meanwhile, the main frame 171 may include a supporting portion 173 for fixing and using the terminal 180 mounted on the mounting portion 175 in a posture lying at a predetermined angle.

Figure 10:
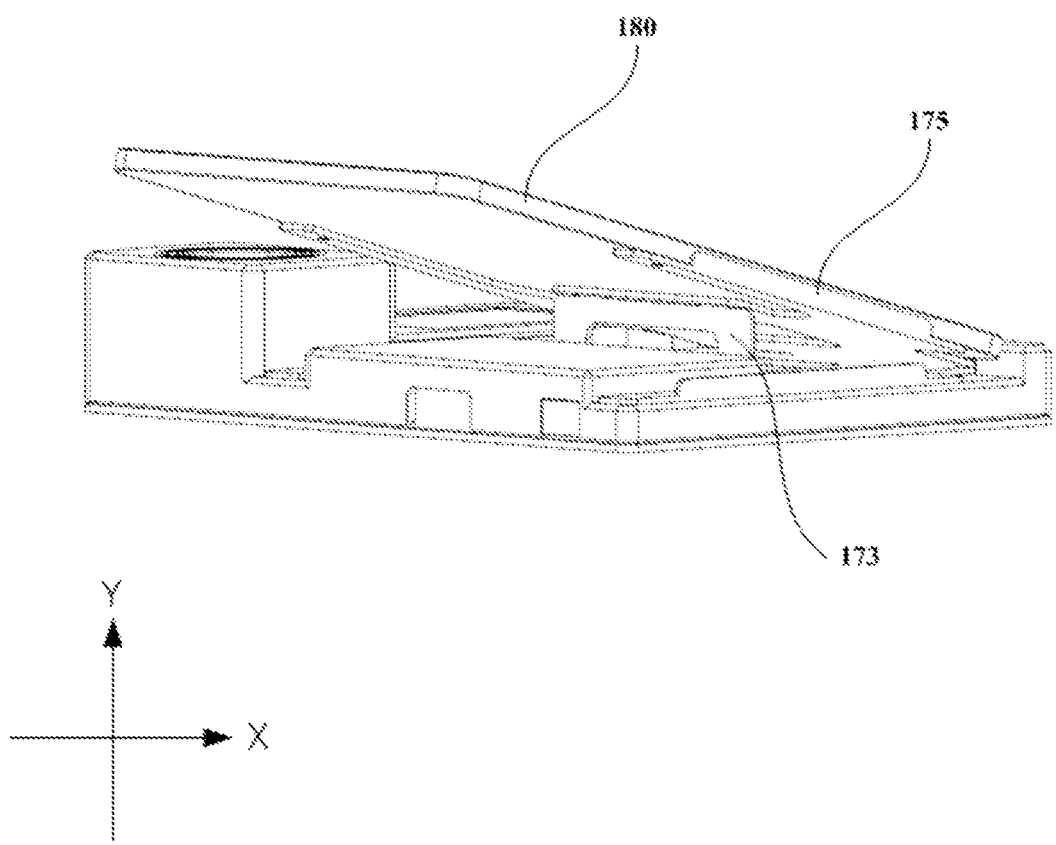

Referring to FIG. 10, the supporting portion 173 is a predetermined supporting member and may be contained between the main frame 171 and the mounting portion 175 to support the mounting portion 175.

Specifically, when the mounting portion 175 is rotated by a predetermined angle with respect to the main frame 171, the supporting portion 173 which is contained between the main frame 171 and the mounting portion 175 may support the mounting portion 175 to maintain a predetermined angle with respect to the main frame 171.

Figure 11:
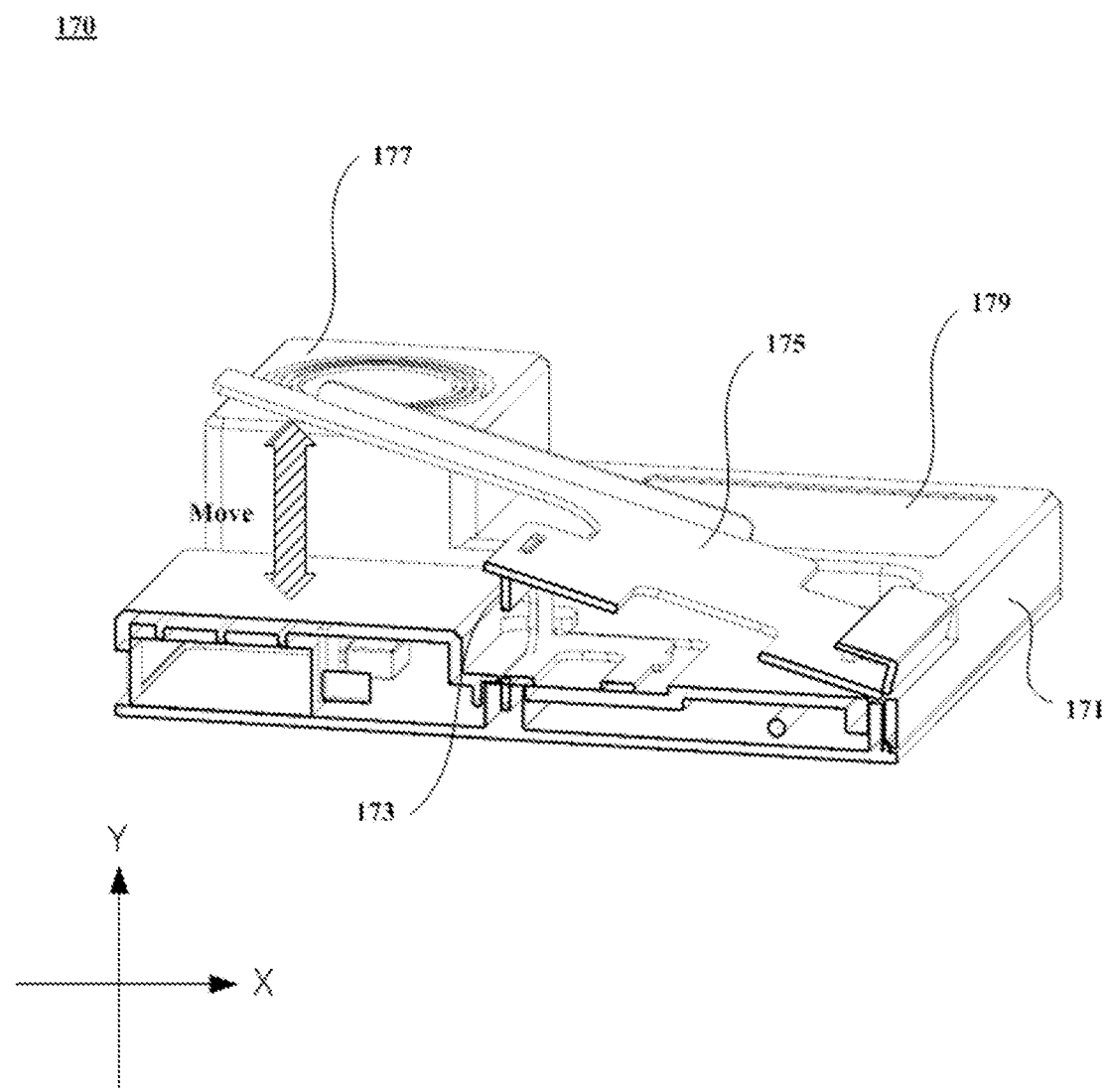

To this purpose, referring to FIG. 11, one side of the mounting portion 175, which is close to the second protruding portion 1711, may be automatically and/or manually lifted at a predetermined angle, and the supporting portion 173 may be automatically and/or manually fixed at right angles with respect to the main frame 171.

In other words, the supporting portion 173 may maintain the main frame 171 and the mounting portion 175 at a predetermined angle; accordingly, the user may use the kiosk 100 more conveniently without unnecessarily adjusting the angle of the terminal 180 each time.

Figure 12:
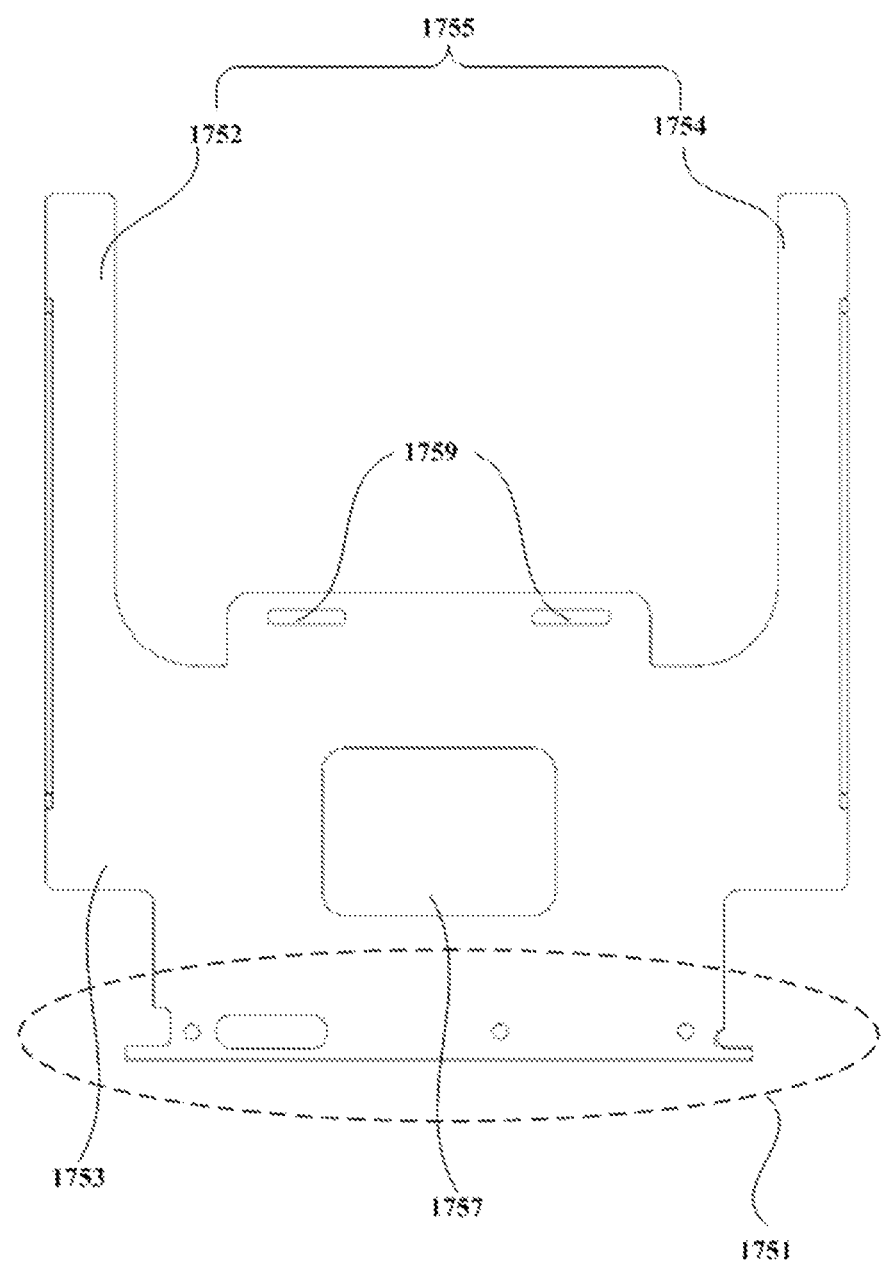

Referring to FIG. 12, the mounting portion 175 may have a plate shape for mounting the terminal 180.

Specifically, the mounting portion 175 may include a rotating portion 1751, a main mounting portion 1753, and/or a wing portion 1755.

The rotating portion 1751 may be connected to one edge (e.g., the hinge portion 1713) of the main frame 171 and may be the reference axis when the mounting portion 175 is rotated.

Also, the rotating portion 1751 may include at least one or more holes for being coupled with a predetermined structure (e.g., the hinge portion 1713) for rotation.

The main mounting portion 1753 may have a predetermined plate shape to mount the terminal 180 and may connected to the rotating portion 1751.

Also, a heat dissipation hole 1757 and/or a supporting hole 1759 may be formed in the main mounting portion 1753.

The heat dissipation hole 1757 is a hole formed on one central side of the main mounting portion 1753 and may be formed in a portion in contact with the terminal 180 mounted on the main mounting portion 1753.

Also, the heat dissipation hole 1757 may be a hole formed to efficiently dissipate the heat generated according to the use of the terminal 180.

The supporting hole 1759 is a hole formed on one side of the main mounting portion 1753 and may be formed in a portion in contact with the supporting portion 173 installed in the main frame 171.

To this end, the supporting portion 173 may have a structure in which a predetermined portion in contact with the supporting hole 1759 protrudes to the outside and may be caught in the supporting hole 1759 to be fixed by being fastened with the supporting hole 1759.

Also, the heat dissipation hole 1757 and/or the supporting hole 1759 is not limited to the example shown in the figure, and fewer or more holes than illustrated may be formed.

The wing portion 1755 is provided on both sides of the main mounting portion 1753, extends in one direction, and includes a first sub-wing portion 1752 and a second sub-wing portion 1754.

At this time, the one direction may be a direction away from the main mounting portion 1753.

Also, at least one part of the wing portion 1755 may meet the terminal 180 mounted on the main mounting portion 1753, and the wing portion 1755 may have a thickness and be built on the material to withstand the load of the terminal 180.

Also, the opened region formed between the first sub-wing portion 1752 and the second sub-wing portion 1754 included in the wing portion 1755 may be coupled with the second protruding portion 1711 contained in the main frame 171 when the mounting portion 175 is rotated downward.

Figure 13:
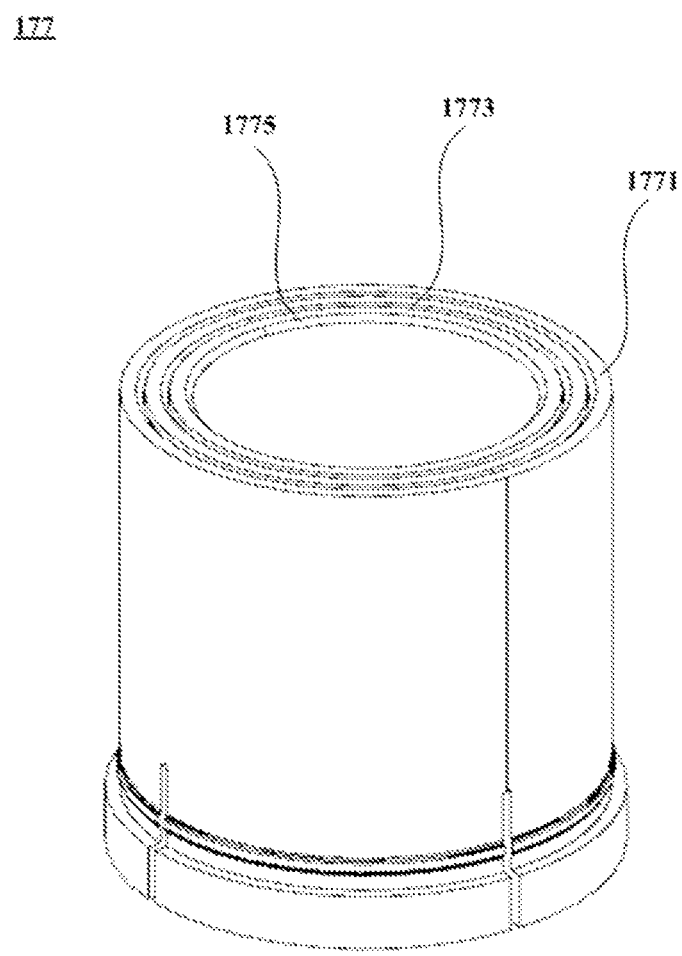

FIG. 13 shows an example of a cylindrical layer included in the cheering stick holder 177.

Referring to FIG. 13, the cheering stick holder 177 may include at least two or more cylindrical layers 1771, 1773, 1775 having different diameters. In what follows, for the convenience of descriptions, it is assumed that the number of at least two or more cylindrical layers is three; however, the present disclosure is not limited to the specific assumption, and the number of cylindrical layers may be more or less than three.

Also, the at least two or more cylindrical layers 1771, 1773, 1775 may be contained in the insertion hole h1 of the cheering stick holder 177. Also, the cylindrical layers may have a cylindrical structure in which one side is opened to mount the cheering stick 200, and a predetermined space is formed therein.

For example, each of the two or more cylindrical layers 1771, 1773, 1775 may have a hollow cylindrical shape. Specifically, each of the two or more cylindrical layers 1771, 1773, 1775 may include outer and inner surfaces and may form a pillar shape with an insertion hole in the center into which the cheering stick 200 may be inserted.

At this time, a second cylindrical layer 1773 having a second diameter may be located inside the first cylindrical layer 1771 having a first diameter among the at least one or more cylindrical layers, and a third cylindrical layer 1775 having a third diameter may be located inside the second cylindrical layer 1773.

Here, the first diameter may be greater than the second diameter, and the second diameter may be greater than the third diameter. Also, the first diameter may be large enough to allow the second cylindrical layer 1773 to be contained, and the second diameter may be large enough to allow the third cylindrical layer 1775 to be contained. In other words, as shown in FIG. 13, the first to third cylindrical layers 1771, 1773, 1775 may overlap and be located on one side of the pedestal 170.

Figure 14:
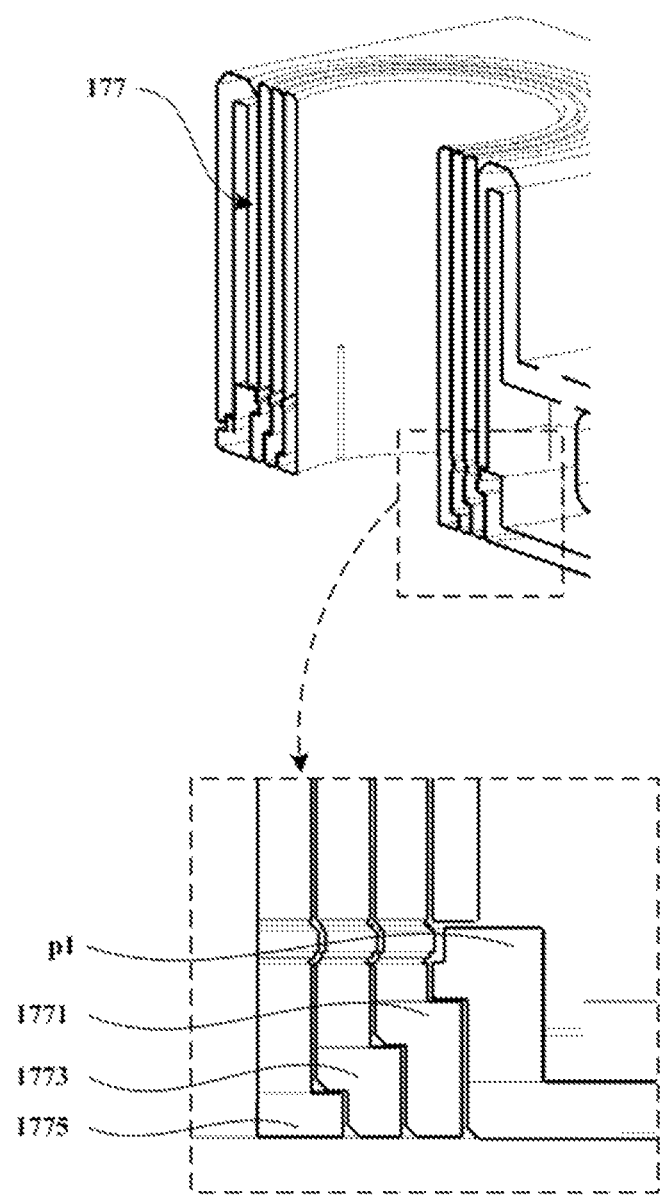

Referring to FIG. 14, the end of the outer surface of each of the first to third cylindrical layers 1771, 1773, 1775 may have a predetermined step structure.

Specifically, the end of the outer surface of the first cylindrical layer 1771 may have a predetermined step structure with the first protruding portion p1 of the cheering stick holder 177, the end of the outer surface of the second cylindrical layer 1773 may have a predetermined step structure with the end of the outer surface of the first cylindrical layer 1771, and the end of the outer surface of the third cylindrical layer 1775 may have a predetermined step structure with the end of the outer surface of the second cylindrical layer 1773.

According to the step structure, the first to third cylindrical layers 1771, 1773, 1775 may overlap, and if necessary, the manager of the kiosk 100 may manually adjust the diameter of the cheering stick holder 177 to fit the diameter of a mounted cheering stick 200 by manually separating the respective layers.

In other words, by manually separating the overlapping predetermined cylindrical layers as needed, there is no room for failure because other configurations are not required; therefore, the repair and maintenance cost is reduced, bringing an economically efficient effect.

Meanwhile, in another embodiment, the cheering stick holder 177 may have a structure for automatically adjusting the diameter of the cheering stick holder 177 to fit the diameter of the cheering stick 200 to be mounted.

In another embodiment, for automatic adjustment of the diameter, the cheering stick holder 177 may further include a spring in a lower portion of each of the at least two or more cylindrical layers. In this case, the lower surface of the main frame 171 may extend to the lower surface of the cheering stick holder 177 to block the lower end of the insertion hole h1, and a spring may be further included between the main frame 171 and the first to third cylindrical layers 1771, 1773, 1775.

At this time, the spring may connect at least one or more cylindrical layers to the main frame 171, and a spring may not be included in a lower portion of the outermost cylindrical layer for connecting and fixing to the main frame 171.

Accordingly, when a cheering stick 200 with a predetermined diameter is mounted on the cheering stick holder 177, the spring is contracted, and at least one or more cylindrical layers with a diameter smaller than the predetermined diameter of the cheering stick 200 may be rotated downward.

For example, in the case of a first cheering stick with a first diameter, the cheering stick holder 177 may mount the first cheering stick by being moved downward as second and third springs contained in the lower portions of the second and third cylindrical layers 1773, 1775 are contracted due to the weight of the first cheering stick.

In other words, the predetermined cylindrical layer rotates downward by a spring to automatically adjust the diameter of the cheering stick holder 177 to fit the diameter of a cheering stick 200 to be mounted. It is convenient because the proposed structure does not require separate measures for adjusting the diameter of the cheering stick holder each time a cheering stick with different diameter is mounted. Also, it is effective in terms of management because there is no risk of loss as a cheering stick is completely separated from the holder.

The terminal 180 and the cheering stick 200 may be mounted on the pedestal 170 included in the pedestal-type kiosk 100 according to another embodiment of the present disclosure including the structure above.

At this time, the kiosk 100 according to another embodiment may obtain predetermined user identification information based on the account authentication device 300 tagged by the tagging portion 1717 of the pedestal 170 and transmit the corresponding seat-library to the cheering stick 200 mounted on the pedestal.

Therefore, at least one or more users using the pedestal-type kiosk 100 according to another embodiment may mount a cheering stick 200 on the cheering stick holder 177 at the performance site before a performance starts and download a seat-library to the cheering stick 200 carried by the user by operating the terminal 180 mounted in advance by a manager and/or a field staff member even if the user has not downloaded the seat-library in advance.

In other words, the kiosk 100 according to the embodiment may provide a library pairing service through which each user may download and/or update a predetermined library to a cheering stick without the help of staff member even in a crowded place such as a concert hall, thereby reducing the number of event personnel to increase the efficiency of event management and reducing the cost required to recruit staff members.

Cheering Stick 200

In the embodiment of the present disclosure, a cheering stick 200 may be a predetermined device that emits light according to a seat-library received from a kiosk 100 based on a library pairing service.

Figure 15:
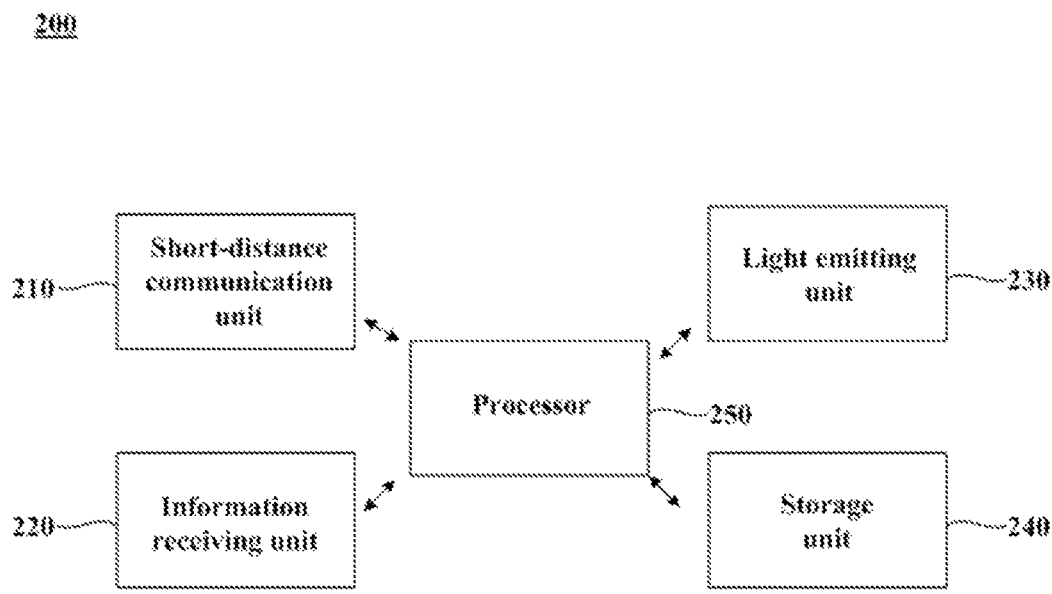
FIG. 15 is an internal block diagram of a cheering stick according to an embodiment of the present disclosure.

FIG. 15 is an internal block diagram of a cheering stick according to an embodiment of the present disclosure.

Referring to FIG. 15, in the embodiment, the cheering stick 200 may include a short-distance communication unit 210, an information receiving unit 220, a light emitting unit 230, a storage unit 240, and a processor 250.

The short-distance communication unit 210 may include one or more devices for communicating with an external device. The short-distance communication unit 210 may communicate through a wireless network.

In the embodiment, the short-distance communication unit 210 may transmit and receive various data related to the library pairing service to and from another terminal and/or an external server.

Specifically, in the embodiment, the short-distance communication unit 210 may connect communication system between the kiosk 100 and the cheering stick 200 by performing pairing based on the cheering stick pairing module 130 of the kiosk 100 and, accordingly, receive the user's seat information and a seat-library corresponding to the seat.

The short-distance communication unit 210 may include a wireless communication module (e.g., at least one of an NFC module, an RF transmitter/receiver, a ZigBee module, a Bluetooth module, and a WIFI module).

In the embodiment, the short-distance communication unit 210 may receive at least one or more data of user account information, user seat information, and a seat-library from the kiosk 100 through short-distance communication using Bluetooth communication.

The information receiving unit 220 may receive information transmitted from the kiosk 100 and other devices through a predetermined communication method (e.g., a broadcasting and/or multicasting method).

Specifically, in the embodiment, the information receiving unit 220 may receive signals transmitted simultaneously to a plurality of devices without designating and/or by designating recipients in the kiosk 100 and other devices.

The light emitting unit 230 may perform a function of emitting light according to a signal received by the information receiving unit 220.

The light emitting unit 230 may include one or more light source elements, and the light source may include a light emitting diode (LED). Also, the light emitting unit 230 may include LEDs of different colors; for example, the light emitting unit 230 may include at least one of a red LED, a green LED, a blue LED, and a white LED.

When the light emitted from each of these LEDs is mixed, a wide range of colors may be created, and the mixed color is determined based on the ratio of the intensities of light emitted from each LED, where the intensity of light emitted from each LED may be proportional to the driving current of the LED.

In the description above, LED is used as a light source of the light emitting unit 230, but the type of light source is not limited to the LED. According to another embodiment, an organic light emitting diode (OLED) may also be used as the light source.

The storage unit 240 may store one or more of various application programs, applications, data, and commands for providing a library pairing service environment.

Also, the storage unit 240 may store data received from or generated by other constituting elements of the library pairing system. The storage unit 240 may be, for example, one of various storage devices such as a ROM, an EPROM, a flash drive, and a hard drive and may include a memory, a cache, and a buffer.

In the embodiment, the storage unit 240 may pre-store the information necessary to perform a light emission function of the cheering stick 200.

For example, the storage unit 240 may pre-store light emitting pattern data.

The light emitting pattern data means the data including the respective light emitting pattern setting values defined in the embodiment for expressing all colors and brightness levels that the cheering stick may implement. For example, the light emitting pattern data may include a plurality of data having a value of (0, 0, 0), (0, 0, 1), (0, 0, 2), . . . , (n, n, n) for expressing color. Also, the light emitting pattern data may include a plurality of data having a value of 0, 1, 2, . . . , n for expressing brightness.

In other words, the storage unit 240 may pre-store the light emitting pattern data; accordingly, the user may manually determine whether to set the cheering stick 200 to emit light, color, brightness, and a light emission effect independently of whether a seat-library is stored.

Also, in the embodiment, the storage unit 240 may store information necessary to perform a library pairing service.

For example, the storage unit 240 may store a seat-library. In this case, the seat-library may be received from another device and stored in the storage unit 240.

The processor 250 may perform the overall operation such as power supply control of the cheering stick 200 and a data processing function of controlling a signal flow between internal constituting elements and processing data. The processor 250 may include at least one processor.

Also, the processor 250 may communicate with each constituting element internally through a system bus and may include one or more predetermined bus structures including a local bus.

Also, the processor 250 may be implemented by using at least one of application-specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

In the embodiment, the processor 250 may control the light emitting pattern of the light output from the light emitting unit 230 by controlling the driving current of each LED of the light emitting unit 230.

Through the operation above, in the embodiment, the processor 250 may control the cheering stick 200 including a plurality of LEDs and may form a predetermined text, image, or video.

The short-distance communication unit 210 and the information receiving unit 220 may be a functional unit separately shown to distinguish at least particular functions of the processor 250 from the general functions of the processor 250.

The cheering stick 200 including the above structure may operate according to at least one or more data stored in the storage unit 240 under the control of the processor 250. As a plurality of users gathers in an auditorium, performance directing may be carried out such that a plurality of cheering sticks 200 are arranged, and a predetermined phrase and image are formed using the cheering sticks 200.

Account Authentication Device: 300

In the embodiment, the account authentication device 300 may include a short-distance communication chip 310, a battery 320, a charging unit 330, a storage module 340, and a controller 350 to perform a function of authenticating the account of a user who wants to use the cheering stick 200.

The short-distance communication chip 310 may be an NFC card and may include any type of device readable by an NFC card reader.

For example, an NFC card is a device including an NFC chip and a coil (antenna) and may have various forms, including a card type, a tag type, and a sticker type.

In the embodiment, the short-distance communication chip 310 may communicate with the kiosk 100 based on the account tag module 120 of the kiosk 100 to transmit and receive data.

The battery 320 may receive external and/or internal power under the control of the controller 350 to supply the power required to operate each constituting element of the account authentication device 300.

The battery 320 may further include a DC/DC converter capable of converting the received power to a voltage level that may be used by the payloads of the account authentication device 300.

Also, the battery 320 includes at least one or more battery cells. The battery cell is not particularly limited to a specific type as long as the battery cell may be repeatedly charged and discharged, such as a lithium-ion cell.

The charging unit 330 may include a wired and wireless charging module for providing a wired and wireless charging process for supplying the power required for the operation of the account authentication device 300.

The storage module 340 may store one or more of various application programs, applications, data, and commands for providing a library pairing service environment.

Also, the storage module 340 may store data received from or generated by other constituting elements of the library pairing system. The storage module 340 may be, for example, one of various storage devices such as a ROM, an EPROM, a flash drive, and a hard drive and may include a memory, a cache, a buffer, and a web storage.

In the embodiment, the storage module 340 may store information necessary to perform a library pairing service.

For example, the storage module 340 may store at least one of a unique user NFC ID and user account information.

At this time, the unique user NFC ID may mean letters and numbers including a predetermined serial number given to each account authentication device 300.

In the embodiment, the storage module 340 may receive and store a seat-library from other constituting elements of the library pairing system.

The controller 350 may perform a function of transmitting at least one or more data stored in the storage module 340 of the account authentication device 300 by controlling the overall structure described above.

Specifically, the controller 350 may transmit the user account information stored in the storage module 340 to the kiosk 100.

In other words, in the embodiment, the account authentication device 300 may authenticate individual users by transmitting and receiving a unique user NFC ID and user account information of a user who wants to use the cheering stick 200.

Also, in the embodiment, the number of account authentication devices 300 that a user may possess is not limited in case a user supports a plurality of artists.

Also, the account authentication device 300 may be implemented in various embodiments by being combined with other structures to be easily carried by the user.

Figure 16:
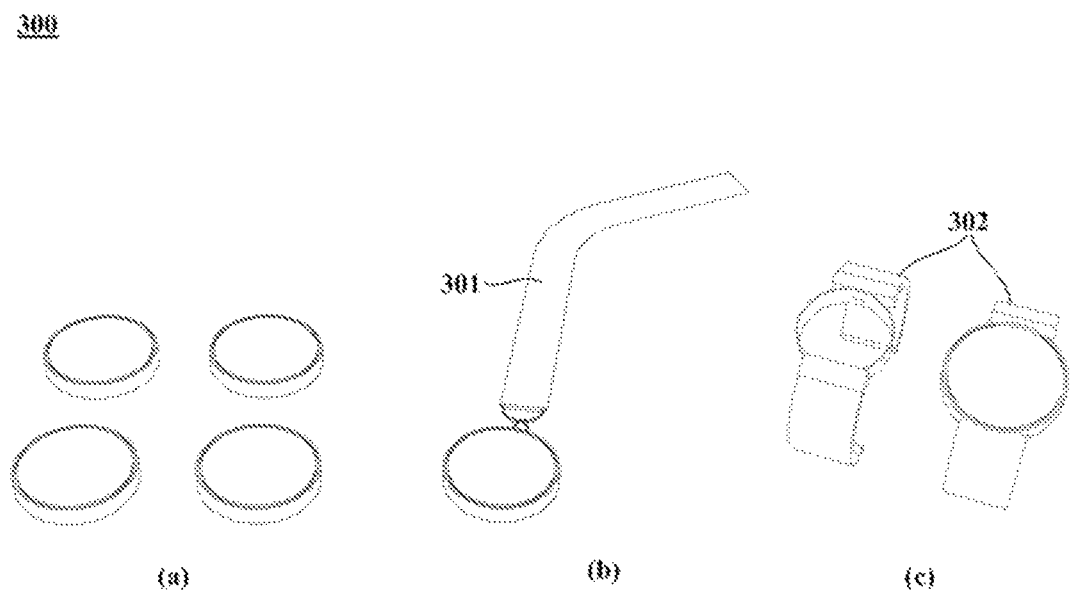
FIG. 16 illustrates examples of shapes of account authentication devices according to an embodiment of the present disclosure.

FIG. 16 illustrates examples of shapes of account authentication devices according to an embodiment of the present disclosure.

Referring to the examples of FIG. 16, the account authentication device 300 may be a chip type as shown in (a). The chip-type account authentication device 300 may have a flat top and bottom surfaces.

Also, the account authentication device 300 may be implemented as a wearable-type device worn on the user's body in combination with other components.

Specifically, the account authentication device 300 may be combined with a first strap 301 that may be hung around the neck as shown in (b) and a second strap 302 that may be worn on the wrist as shown in (c).

The various shapes of the account authentication device 300 above make it easy for a user to carry and, at the same time, to easily maintain the account authentication device 300 at a predetermined location for a predetermined time for pairing or tagging, thereby improving the user's convenience in using the account authentication device 300.

User Device: 400

The user device 400 according to an embodiment of the present disclosure may be a predetermined computing device in which an application for performing a library pairing service is installed.

Specifically, from a hardware point of view, the user device 400 may include a mobile-type computing device and a desktop-type computing device in which a pairing application is installed.

For example, the mobile-type computing device may include a smartphone, a mobile phone, a digital broadcasting terminal, a personal digital assistant (PDA), a portable multimedia player (PMP), and a tablet PC.

Also, the desktop-type computing device may include a fixed-type desktop PC, a laptop computer, and a personal computer such as an ultrabook in which a program for executing a library pairing service based on wired/wireless communication is installed.

In the embodiment of the present disclosure, for the convenience of descriptions, it is assumed that the user device 400 is implemented using a smartphone, which is a mobile-type computing device.

From a functional point of view, the user device 400 may include a memory 410, a processor 420, a communication module 430, and an input/output system 440.

Specifically, the memory may store the cheering stick management application 411, and the cheering stick management application 411 may store one or more of various applications, data, and commands for providing a library pairing service environment.

In other words, the memory 410 may store commands and data for creating a library pairing service environment.

The processor 420 may include at least one or more processors capable of executing instructions of the cheering stick management application 411 stored in the memory to perform various tasks for creating the library pairing service environment.

In the embodiment, the processor 420 may control the overall operation of the constituting elements through the cheering stick management application 411 of the memory to provide a library pairing service.

The communication module 430 may include one or more devices for communicating with an external device. The communication module 430 may communicate through a wireless network.

Specifically, the communication module 430 may communicate with a terminal (in the embodiment, the kiosk 100, the cheering stick 200, and the account authentication device 300) storing content sources for implementing the library pairing service environment and an external server (in the embodiment, a ticket sales server and the performance management server 500); the communication module 430 may communicate with various user input components such as a controller receiving a user input.

The input/output system 440 may include a sensor system, an input system, and a display system; since the function of the input/output system 440 is the same as that of the input/output system described with respect to the kiosk 100, descriptions corresponding to those of the kiosk 100 will be applied with necessary modifications.

The constituting elements may be configured to be included in the housing of the user device 400.

In the embodiment, the user device 400 may communicate with a predetermined platform and service server.

Also, in the embodiment, the user device 400 may obtain user account information including a plurality of information related to the user's personal information (e.g., a name, date of birth, service ID, and mobile phone number) from a predetermined platform and service server.

At this time, if the user has not previously signed up for a predetermined platform and service, the user terminal 400 in the embodiment may obtain user account information by providing a predetermined membership registration process for generating user account information.

Also, the user device 400 may obtain a unique user NFC ID of the account authentication device 300 tagged to the user device 400.

At this time, when the account authentication device 300 is not recognized, so the tagging is not possible, the user device 400 in the embodiment allows the user to directly input and register the unique user NFC ID based on a predetermined input process, thereby obtaining the unique user NFC ID.

Also, when the number of unique user NFC IDs obtained is larger than one, the user device 400 may register as many account authentication devices 300 as the number corresponding to the number of the obtained IDs on the cheering stick management application 411.

Also, the user device 400 may activate, among at least one or more registered account authentication devices 300, only the account authentication device 300 that the user wants to use.

Also, the user device 400 may select a predetermined mode that activates the light emitting pattern of the cheering stick 200.

For example, the user device 400 may set the mode to a concert mode or a self mode. At this time, the concert mode may include an offline concert mode and an un-tact concert mode.

When the offline concert mode is selected, the user device 400 may provide a process for selecting a performance for which a seat-library is stored by checking the storage state of the seat-library or a process for describing the position of a kiosk 100 that provides the seat-library.

When the un-tact concert mode is selected, the user device 400 may provide a process for providing a guide for downloading predetermined performance preparation data.

When the self mode is selected, the user device 400 may provide a process for manually setting the light emitting pattern data pre-stored in the cheering stick 200.

As described above, by setting a predetermined mode on the user device 400, the user may tag the account authentication device 300 to perform pairing at an auditorium or home; even at normal times when the user does not watch a performance, the user may perform an operation of controlling the color of a mood light.

Also, based on the cheering stick management application 411, the user device 400 may provide pairing-related information such as guiding the location of a kiosk 100 in an auditorium and the operating hours of a booth selling goods or outputting a self-pairing guide image.

Performance Management Server: 500

Meanwhile, the performance management server 500 according to the embodiment of the present disclosure may perform a series of processes for providing a library pairing service.

Specifically, in the embodiment, the performance management server 500 may provide the library pairing service by exchanging, with an external device such as the kiosk 100, data necessary for operating a library pairing providing process in the external device.

More specifically, in the embodiment, the performance management server 500 may provide an environment in which a plurality of applications installed in a plurality of devices performing a library pairing service in an external device may operate.

To this end, the performance management server 500 may include an application program, data, and/or commands for operating the application and may transmit and receive data based thereon to and from the external device.

Also, in the embodiment, the performance management server 500 may acquire at least one or more pieces of ticket reservation information by communicating with an external server (e.g., a ticket sales server).

At this time, the ticket reservation information may include the name and date of birth of the person who has purchased the ticket, ticket site ID, a mobile phone number, a performance name, performance date and time, a performance venue, a reservation number, the number of advance tickets, and seat information.

Also, in the embodiment, the performance management server 500 may provide, to an external device (in the embodiment, a kiosk 100), ticket reservation information matching the user account information among the at least one or more ticket reservation information obtained.

At this time, in the embodiment, the performance management server 500 may determine whether the ticket reservation information matches the user account information based on the mobile phone number, which is the information common to each piece of information. This case is only an example; various other embodiments determine whether the ticket reservation information matches the user account information using the user's personal information other than a mobile phone number.

Also, in the embodiment, the performance management server 500 may extract seat information from the matched ticket reservation information.

At this time, the seat information in the embodiment is used as a reference for distinguishing the performance preparation data 1000 for each seat; in the embodiment, the performance management server 500 may generate a plurality of seat libraries by matching the seat information to the performance preparation data 1000.

Also, in the embodiment, the seat information may include at least one of the seat number and the pixel number.

In the embodiment, when the seat information is exposed to the user, the seat information is exposed using a seat number used in an actual auditorium in the form of, for example, "3rd floor, 12th section, row A, no. 1"; however, in the case of a device exhibiting a light emitting pattern, the seat information may be exposed using a pixel number based on a seating chart for the convenience of performance directing.

In other words, the performance preparation data using a pixel number in a director's device may be converted to a seat number when the performance preparation data is generated as a seat-library in the performance management server 500, and for this purpose, the pixel number may be matched in advance to the corresponding seat number.

Also, in the embodiment, the performance management server 500 may pre-store and manage a plurality of seat libraries generated for each seat number in the database 530.

Also, in the embodiment, the performance management server 500 may provide a seat-library generated according to the extracted seat information to an external device (in the embodiment, the cheering stick 200 and the account authentication device 300).

Also, in the embodiment, the performance management server 500 may store and manage various application programs, commands, and/or data for implementing a library pairing service.

On the other hand, referring further to FIG. 1, the performance management server 500 in the embodiment may be implemented using a predetermined computing device including at least one or more processor modules 510 for data processing, at least one or more communication modules 520 for data exchange with an external device, and at least one or more database 530 (i.e., a "memory module") for storing various application programs, data, and/or commands for providing a library pairing service.

Here, the database 530 may store one or more of an operating system (OS), various application programs, data, and commands for providing a library pairing service.

Also, database 530 may include a program and data areas.

Here, the program area according to the embodiment may be linked between an operating system (OS) for booting a server and functional elements, and the data area may store data generated according to the use of the server.

In the embodiment, the database 530 may be one of various storage devices, such as a ROM, a RAM, an EPROM, a flash drive, and a hard drive; and may be a web storage performing a storage function of the memory 150 on the Internet.

Also, the database 530 may be a recording medium detachable from a server.

Meanwhile, the processor module 510 may control the overall operation of the respective units to implement a library pairing service.

The processor module 510 may be a system-on-chip (SOC) suitable for a server including a central processing unit (CPU) and/or a graphic processing unit (GPU), execute the operating system (OS) and/or an application program stored in the database 530, and control the respective constituting elements mounted on the server.

Also, the processor module 510 may communicate with each constituting element internally through a system bus and may include one or more predetermined bus structures including a local bus.

Also, the processor module 510 may be implemented by using at least one of application-specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

In the description above, it was assumed that the performance management server 500 according to an embodiment of the present disclosure performs the functional operation as described above. Depending on the embodiments, however, various embodiments may be implemented such that an external device (e.g., a kiosk 100) may perform at least part of the functional operation performed by the performance management server 500, or the performance management server 500 may further perform at least part of the functional operation performed in the external device.

Method for Providing a Seat-Library to a Cheering Stick 200

In what follows, a method for providing a seat-library to a cheering stick 200 by at least one or more processors of a kiosk 100 according to an embodiment of the present disclosure will be described in detail with reference to FIGS. 17 to 19.

According to an embodiment of the present disclosure, at least one or more processors of the kiosk 100 may execute at least one or more applications stored in at least one or more memories 150 or may operate the at least one or more applications in a background state.

In what follows, the assumption that the at least one or more processors perform the method for providing the library pairing service by operating to execute the commands of the application is simplified to the assumption that the processor assembly 160 performs the method.

Figure 17:
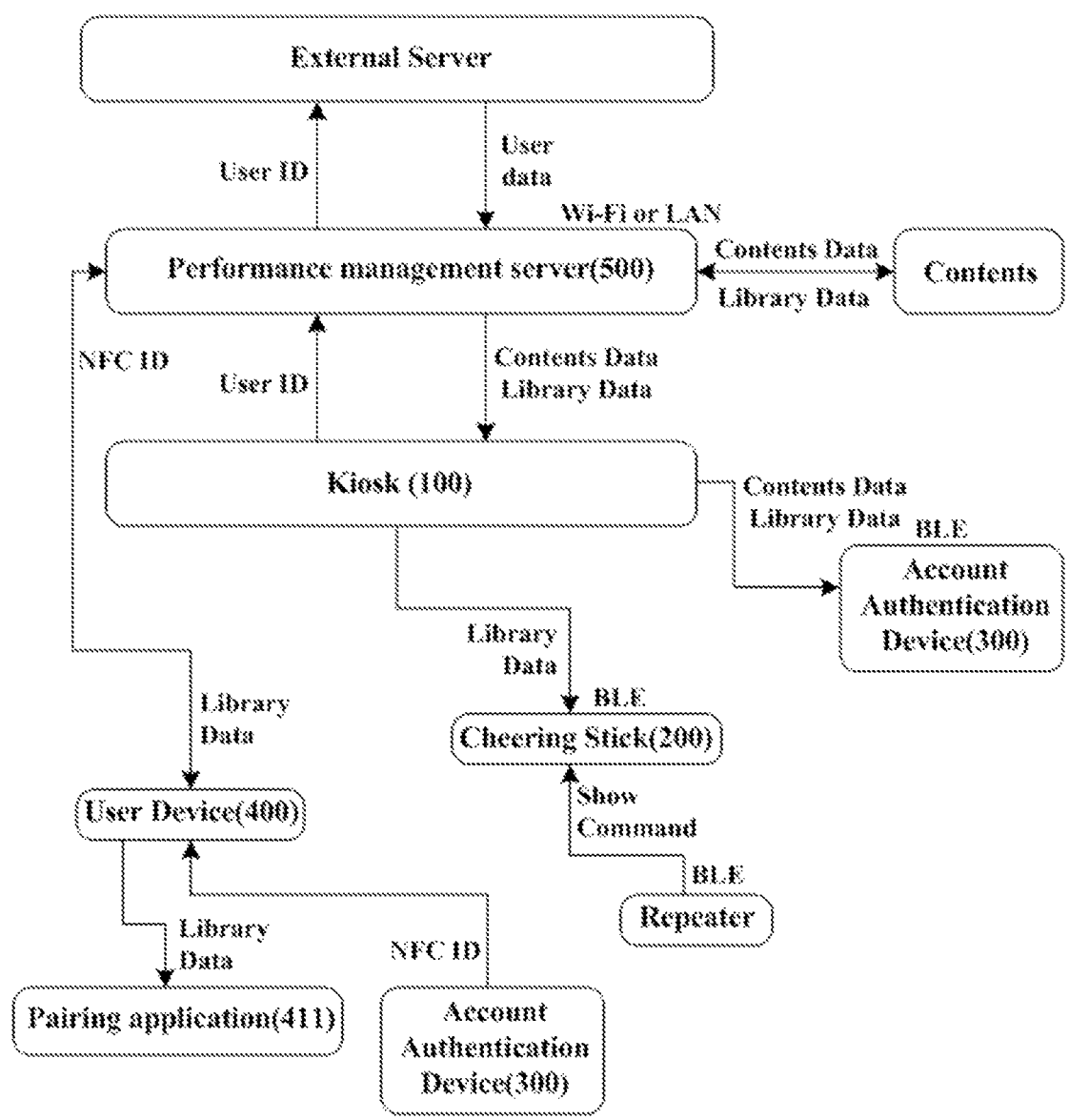
FIG. 17 is a flow diagram illustrating a method for providing a seat-library according to an embodiment of the present disclosure.

FIG. 17 is a flow diagram illustrating a method for providing a seat-library according to an embodiment of the present disclosure.

Referring to FIG. 17, in the embodiment, the processor assembly 160 of the kiosk 100 may provide a seat-library to at least one or more terminals between the cheering stick 200 and the account authentication device 300.

In the embodiment, the cheering stick 200 may receive a seat-library directly from the kiosk 100. In another embodiment, a seat-library may be indirectly received from the account authentication device 300 that has received the seat-library from the kiosk 100.

In the embodiments below, for the convenience of descriptions, it is assumed that the processor assembly 160 controls a cheering stick pairing module 130 to directly provide a seat-library to the cheering stick 200.

Figure 18:
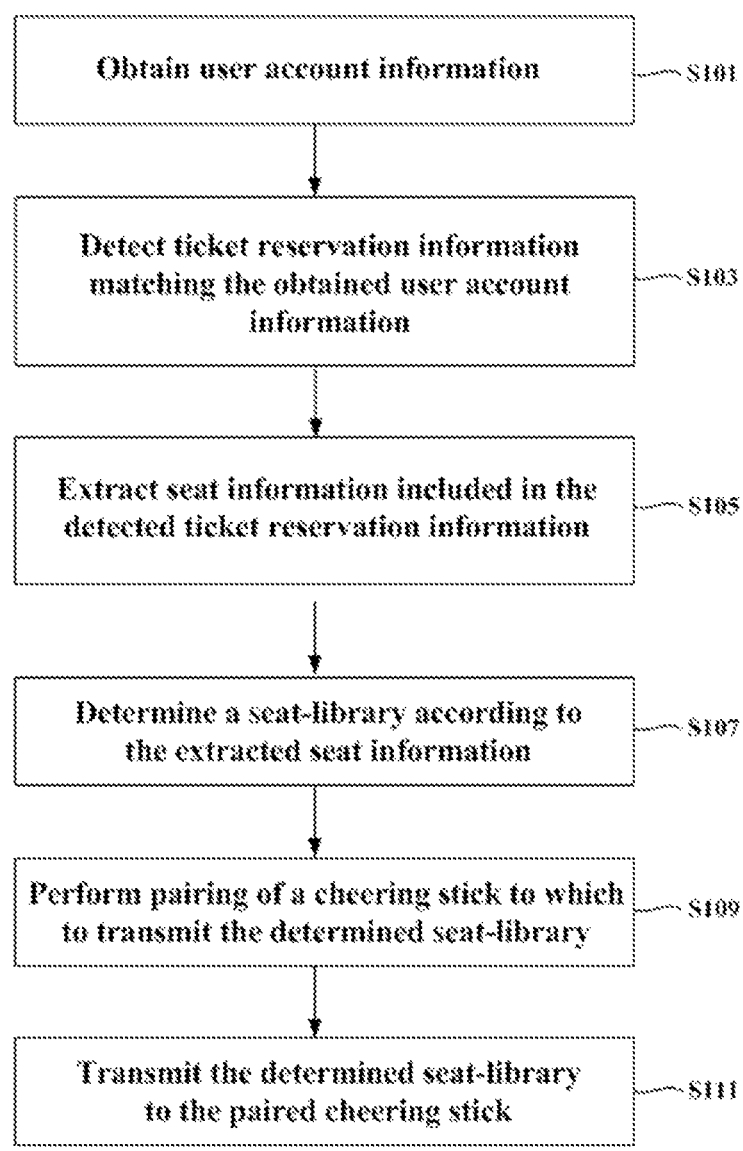
FIG. 18 is a specific flow diagram illustrating a method for providing a seat-library to a cheering stick by a processor assembly according to an embodiment of the present disclosure.

FIG. 18 is a specific flow diagram illustrating a method for providing a seat-library to a cheering stick by a processor assembly according to an embodiment of the present disclosure.

Referring to FIG. 18, in the embodiment, the kiosk 100 may obtain the user account information through the account tag module 120 S101.

In the embodiment, the processor assembly 160 may receive the user account information obtained from detecting and recognizing the user's account authentication device 300 by the account tag module 120.

Specifically, the processor assembly 160 may perform short-distance communication with the user's account authentication device 300 tagged by the account tag module 120 of the kiosk 100 and obtain the user account information pre-stored in the tagged account authentication device 300.

For this purpose, the user may bring the account authentication device 300 which is corresponding to the performance that the user wants to see closer the account tag module 120 of the kiosk 100.

At this time, in the embodiment, the processor assembly 160 may control the display to output a guide for guiding the recognition location of the account authentication device 300 to perform normal short-distance communication.

Also, the account tag module 120 may recognize the account authentication device 300 close to the account tag module 120 based on the NFC function.

Accordingly, the account tag module 120 may receive the user account information from the recognized account authentication device 300.

Also, in another embodiment, the kiosk 100 may obtain user account information by sensing a ticket held by the user.

Specifically, in another embodiment, the processor assembly 160 may sense a ticket held by the user based on the image sensor 141 and obtain the user account information by performing optical character recognition (OCR) for the sensed ticket.

Optical character recognition (OCR) refers to the technology for acquiring an image of characters written by a human or printed by a machine using an image scanner and converting the acquired image into machine-readable characters.

In another embodiment, the processor assembly 160 may control to photograph the ticket held by the user using the image sensor 141 included in the kiosk 100.

Subsequently, in another embodiment, the processor assembly 160 may obtain a ticket image TI, which is an image capturing the ticket held by the user.

Figure 19:
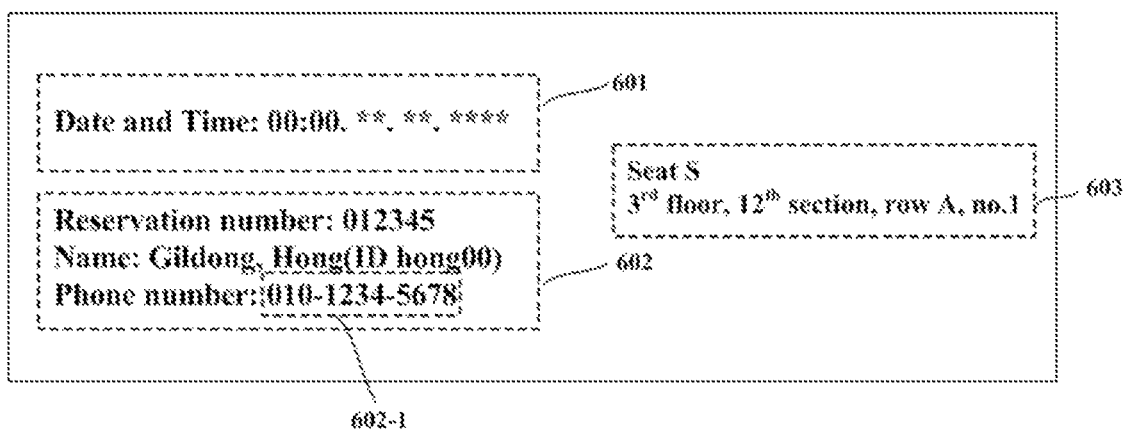
FIG. 19 illustrates one example of a ticket image according to an embodiment of the present disclosure.

FIG. 19 illustrates one example of a ticket image according to an embodiment of the present disclosure.

Referring to FIG. 19, the processor assembly 160 according to another embodiment may detect one or more object areas 601 to 603 within the obtained ticket image TI.

In another embodiment, the object area 601 to 603 mean an area including a predetermined text. In another embodiment of the present disclosure, the object area is divided into a first object area 601 including date, time, and place information; a second object area 602 including user account information; and a third object area 603 including seat information.

Also, in another embodiment, the processor assembly 160 may set a target image among the detected object areas 601 to 603. At this time, the target image means a target image of optical character recognition (OCR).

Specifically, in another embodiment, since the information to be obtained is user account information, the processor assembly 160 may set the second object area 602 which includes the user account information as the target image based on the position output on the ticket image TI.

Also, in another embodiment, the processor assembly 160 may extract the text included in the set target image.

In the example of FIG. 19, the processor assembly 160 may extract text such as "reservation number: 012345," "person who has made a reservation: Gil-dong Hong (ID: hong00)," and "phone number: 010-1234-5678."

In other words, in another embodiment, the processor assembly 160 may obtain user account information including the plurality of extracted text by extracting the text included in the set target image.

At this time, in another embodiment, the processor assembly 160 may re-extract predetermined information included in the user account information using a predetermined character extraction function (e.g., FIND, LEFT, MID, and RIGHT) for extracting desired text by searching the whole extracted text for a specific character.

Referring back to FIG. 19, for example, in another embodiment, to re-extract a user's mobile phone number included in the user account information, the processor assembly 160 may use a predetermined character extraction function to obtain the user's mobile phone number 602-1, which is "010-1234-5678" in the example.

In other words, in another embodiment, the processor assembly 160 may obtain the user account information by performing an optical character recognition process on the obtained ticket image TI and extracting text from the ticket image TI.

Also, in another embodiment, the processor assembly 160 may acquire the user account information and the ticket reservation information simultaneously by performing optical character recognition (OCR) on the obtained ticket image TI; in this case, the S103 step to be described later may be omitted, and the next step may be performed.

In another embodiment, the processor assembly 160 may obtain the user account information based on manual input from the user.

To this end, in another embodiment, the processor assembly 160 may perform a search process that searches for the information matching the service ID and a mobile phone number entered by the user.

Referring again to FIG. 18, in the embodiment, the processor assembly 160 may detect the ticket reservation information matching the obtained user account information S103.

In the embodiment, the processor assembly 160 of a kiosk 100 implemented as an online-type device may detect the ticket reservation information matching the obtained user account information by communicating with an external server (e.g., a ticket sales server) based on the performance management server 500. At this time, the number of pieces of ticket reservation information matched according to the number of seats reserved by the user through the same account may be more than one, and ticket reservation information specific to each performance may be further included.

To this end, in the embodiment, the processor assembly 160 may interoperate with an external server (e.g., a ticket sales server) to detect the ticket reservation information that matches the user account information among at least one or more pieces of ticket reservation information stored in the database of the external server and that corresponds to the performance to be played within a predetermined time in an auditorium in which the kiosk 100 is installed.

In other words, in the embodiment, the processor assembly 160 of the kiosk 100 implemented as an online-type device may not only protect the user's personal information but also reduce the amount of data to be stored in the memory by detecting only the ticket reservation information matching the user account information through interoperation with the external server.

In another embodiment, the processor assembly 160 of the kiosk 100 implemented as an online-type device may detect the ticket reservation information matching the user account information among a plurality of ticket reservation information stored in the memory 150.

For example, the processor assembly 160 may execute the search process to detect the ticket reservation information matching the user account information from a list including a plurality of ticket reservation information.

In other words, in another embodiment, the processor assembly 160 of the kiosk 100 implemented as an offline-type device may reduce the time and cost required for connecting to a server by detecting only the ticket reservation information matching the user account information among pre-stored ticket reservation information.

Next, in the embodiment, the processor assembly 160 may extract seat information included in the detected ticket reservation information S105.

At this time, the number of extracted seat information may be more than one depending on the number of reserved tickets purchased by the user through the same account.

In the embodiment, when the user reserves a plurality of seats for the same performance using the same ticket site ID, the processor assembly 160 may output the information on a plurality of detected ticket reservations on the touchscreen.

For example, the processor assembly 160 may provide a ticket list including the plurality of detected ticket reservation information through a display.

At this time, in the embodiment, the processor assembly 160 may output on the touch screen the date and time of a performance, a ticket reservation number, seat number, and the like so that the user may select one from among a plurality of ticket reservation information.

Subsequently, the user may touch one ticket reservation information from a ticket list output on the touchscreen, and the processor assembly 160 in another embodiment may select the corresponding ticket reservation information by receiving the user's touch input based on a user interface.

Also, in another embodiment, the processor assembly 160 may determine a seat-library to be transmitted to the cheering stick 200 according to the seat information included in the selected ticket reservation information.

Next, in the embodiment, the processor assembly 160 may determine the seat-library according to the extracted seat information S107.

Specifically, in the embodiment, the processor assembly 160 may determine the seat-library according to the seat information of the ticket reservation information.

At this time, a plurality of seat libraries may be mapped to each individual seat information and pre-stored in the memory 150 or the database 530.

In the embodiment, the processor assembly 160 may compare seat information in the ticket reservation information with seat information of a plurality of seat libraries pre-stored in the memory 150 or the database 530 by the performance management server 500.

Also, in the embodiment, the processor assembly 160 may detect one seat-library, the seat information of which matches the extracted seat information among a plurality of seat libraries and determine the detected seat-library as a seat-library to be transmitted in the subsequent step.

Also, in the embodiment, the processor assembly 160 may display the seat information (e.g., seat number) of the determined seat-library and guide information related to pairing of the cheering stick 200 on the display of the kiosk 100 so that the user is informed of a selected seat and a regular pairing process is performed.

Next, in the embodiment, the processor assembly 160 may perform pairing of a cheering stick 200 to which the determined seat-library is to be transmitted S109.

Specifically, in the embodiment, the processor assembly 160 may perform pairing that performs short-distance communication based on the cheering stick pairing module 130 of the kiosk 100 and the short-distance communication unit 210 of the cheering stick 200 to transmit the determined seat-library to the cheering stick 200.

To this end, the user may touch or bring the cheering stick 200 corresponding to the seat in the performance to watch to the cheering stick pairing module 130 of the kiosk 100.

At this time, in the embodiment, the processor assembly 160 may output on the touchscreen a guide guiding the mounting position and the mounting duration of the cheering stick 200 to perform normal pairing.

Accordingly, in the embodiment, the processor assembly 160 may link the cheering stick 200 which is being touched and kept close to the cheering stick pairing module 130 with the kiosk 100 through Bluetooth communication.

Next, in the embodiment, the processor assembly 160 may transmit the determined seat-library to the paired cheering stick 200 S111.

At this time, in the embodiment, since the kiosk 100 and the cheering stick 200 transmit and receive a seat-library based on short-distance communication, the touchscreen may output a guide for informing that the cheering stick 200 has to be touched and kept close to the cheering stick pairing module 130 of the kiosk 100 while the determined seat-library is transmitted to the paired cheering stick 200.

Also, when the transmission is completed, the processor assembly 160 according to the embodiment may inform the user that the transfer of the seat-library is completed by using a method of outputting a predetermined notification sound based on an audio sensor, outputting predetermined text based on the display 143, operating the first and second LED modules 120-1, 130-1, or automatically opening the cover 132 of the kiosk.

In other words, the processor assembly 160 according to the embodiment may obtain the user's seat information without the user directly entering the seat number and transmit only the seat-library corresponding to the user's seat to the cheering stick 200, thereby minimizing an error due to collision with seat libraries of other performances.

Method for Providing a Device Management Service by the User Device 400

In what follows, a cheering stick management application 411 of the user device 400 executed by at least one or more processors of the user device 400 according to an embodiment of the present disclosure will be described in detail with reference to FIGS. 20 to 22.

At this time, the cheering stick management application 411 according to an embodiment of the present disclosure is an application that provides a service (in what follows, a device management service) for managing and controlling at least one or more devices (in the embodiment, the cheering stick 200 and the account authentication device 300) carried by the user, which is different from the applications included in the kiosk 100, the cheering stick 200, and the account authentication device 300 and for which the control range may be different from those of other applications.

At least one or more processors of the user device 400 according to an embodiment of the present disclosure may execute at least one or more cheering stick management applications 411 stored in at least one or more memories or may operate the applications in a background state.

In what follows, the assumption that the at least one or more processors perform the method for providing the device management service by operating to execute the commands of the cheering stick management application 411 is simplified to the assumption that the cheering stick management application 411 performs the method.

Figure 20:
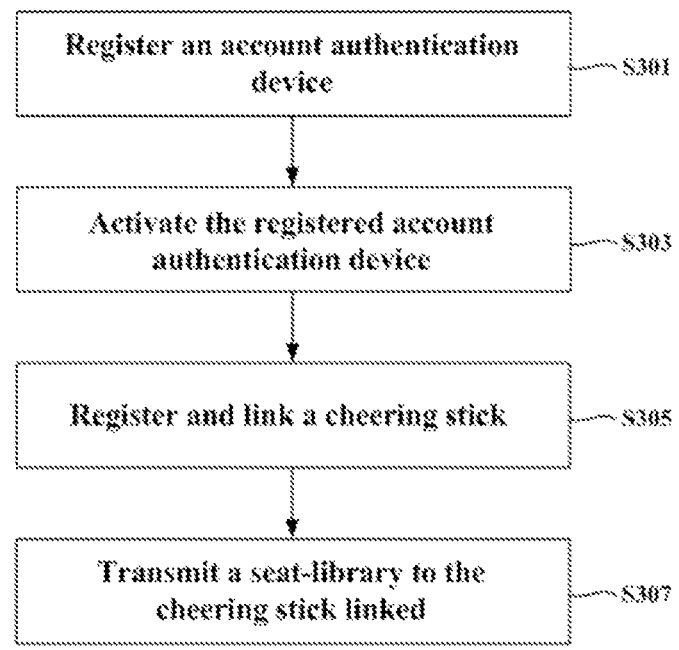
FIG. 20 is a flow diagram illustrating a method for transmitting a seat-library to a cheering stick by a user device according to an embodiment of the present disclosure.
Figure 21:
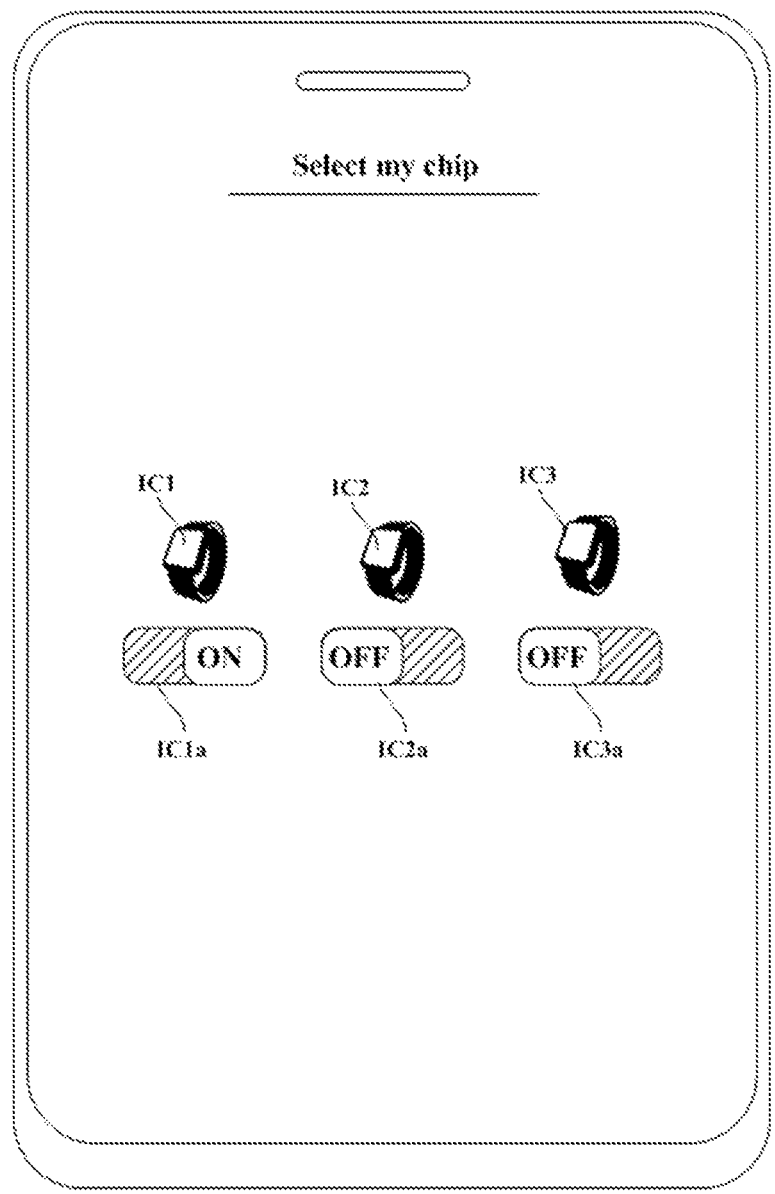
FIG. 21 and FIG. 22 are examples illustrating an output screen of a cheering stick management application of a user device according to an embodiment of the present disclosure.
Figure 22:
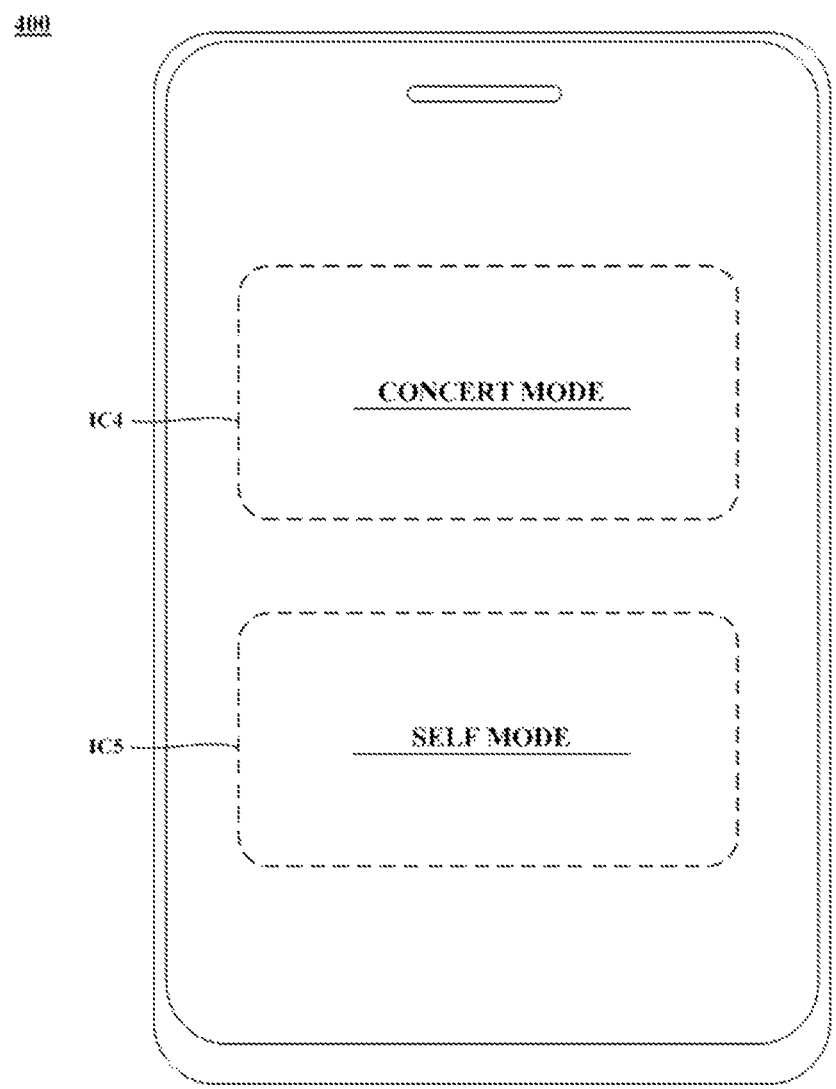

FIG. 20 is a flow diagram illustrating a method for transmitting a seat-library to a cheering stick by a user device according to an embodiment of the present disclosure, and FIGS. 21 and 22 are examples illustrating an output screen of a cheering stick management application of a user device according to an embodiment of the present disclosure.

In the embodiment, the cheering stick management application 411 may register the account authentication device 300 in the user device 400 S301.

Specifically, in the embodiment, the cheering stick management application 411 may register the account authentication device 300 in the user device 400 based on short-distance communication.

To this end, the user may touch or bring closer the account authentication device 300 to the user device 400.

Also, in the embodiment, the cheering stick management application 411 may register each of a plurality of account authentication devices 300 to the user device 400 when the number of account authentication devices 300 held by the user is more than one.

At this time, the user account information included in the plurality of account authentication devices 300 are the same, and only the unique user NFC ID assigned to each account authentication device 300 is different from each other.

In the embodiment, the user device 400 is limited to a device that supports the NFC function, and if the user device does not support the NFC function or may not be registered due to an operation error, the user may register the account authentication device 300 through a process that allows the user directly enter the unique user NFC ID.

Next, in the embodiment, the cheering stick management application 411 may activate the account authentication device 300 to use among the account authentication devices 300 registered in the user device 400 S303.

In the embodiment, when there is one registered account authentication device 300, the cheering stick management application 411 may automatically activate the account authentication device 300.

On the other hand, in another embodiment, if there are a plurality of registered account authentication devices 300, the cheering stick management application 411 may display at least one or more account authentication devices 300 registered in the user terminal 400 on a display.

Referring to FIG. 21, the cheering stick management application 411 may display at least one or more account authentication device icons (IC1 to IC3) on the display so that the icons correspond to the number of at least one or more account authentication devices 300 registered in the user device 400.

Also, the user may determine one account authentication device 300 required for seeing the corresponding performance according to the desired artist and the performance date and time.

Subsequently, the user may input a touch to determine the determined account authentication device 300 based on a user interface; accordingly, the cheering stick management application 411 may activate the account authentication device 300 to use.

In the embodiment, the cheering stick management application 411 may output at least one or more activation buttons IC1a to IC3a on the display to activate the account authentication device 300 based on the user's touch input.

The activation buttons IC1a to IC3a may be output at the bottom of the account authentication device icons IC1 to IC3, and the activation buttons may have different shapes depending on the activation state.

For example, the shape of the first activation button IC1a shown in FIG. 21 indicates that the account authentication device 300 corresponding to the account authentication device icon IC1 is in the activated state; the shapes of the second and third activation buttons IC2a, IC3a may indicate that the account authentication devices 300 corresponding to the account authentication device icons IC2, IC3 are in the inactive state.

The user may perform a touch input by touching these activation buttons IC1a to IC3a; accordingly, in the embodiment, the cheering stick management application 411 may link the account authentication device 300 that the user wants to use with the user device 400 by activating the account authentication device 300 to use.

Meanwhile, in the embodiment, the user may activate the account authentication devices 300 matched to each performance and ticket reservation number based on the cheering stick management application 411.

To this end, the cheering stick management application 411 may pre-match the performance and ticket reservation number to each account authentication device 300 when the account authentication device 300 is registered.

For example, the cheering stick management application 411 may output a list including at least one or more performances that the user has reserved on the display.

Also, when the user selects one performance included in the list, the cheering stick management application 411 may automatically activate the account authentication device 300 pre-matched to the corresponding performance among at least one or more account authentication devices 300 registered in the user device 400.

In the same way, for example, the cheering stick management application 411 may output a list including reservation numbers of at least one or more tickets the user has purchased.

Also, when the user selects one ticket reservation number included in the list, the cheering stick management application 411 may automatically activate the account authentication device 300 pre-matched to the corresponding ticket reservation number among at least one or more account authentication devices 300 registered in the user device 400.

Also, in the embodiment, the cheering stick management application 411 may register and link the cheering stick 200 to the user device 400 S305.

Specifically, in the embodiment, the cheering stick management application 411 may register and link the cheering stick 200 to the user device 400 based on short-range communication, and since details of performing short-distance communication are the same as those given in the S301 and S303 steps, descriptions given to the S301 and S303 will be applied with necessary modifications.

On the other hand, the cheering stick 200 registered in the user device 400 may be one cheering stick 200 corresponding to the performance that the user wants to see among at least one or more cheering sticks 200 owned by the user.

Also, in the embodiment, the cheering stick management application 411 may transmit a seat-library to the cheering stick 200 linked S307.

To this end, in the embodiment, the cheering stick management application 411 may obtain the user account information based on the information included in the registered account authentication device 300 and the information entered when the user logs into the cheering stick management application 411.

Also, in an embodiment, the cheering stick management application 411 may detect ticket reservation information matching the user account information obtained by communicating with an external server (e.g., a ticket sales server).

At this time, the cheering stick management application 411 may skip the step of obtaining the user account information when the user is not a member and may obtain ticket reservation information based on the user's manual input.

Also, in an embodiment, the cheering stick management application 411 may determine a seat-library based on the detected ticket reservation information.

At this time, the cheering stick management application 411 may output a plurality of detected ticket reservation information on the display of the user device 400 when the user has reserved a plurality of seats for the same performance using the same service ID.

The user may select one ticket reservation information among a plurality of ticket reservation information output to the user device 400, and the cheering stick management application 411 according to the embodiment may determine a seat-library based on the seat information included in the selected ticket reservation information.

Accordingly, in the embodiment, the cheering stick management application 411 may transmit the determined seat-library to the cheering stick 200 registered and linked.

Also, the user may register and link at least one or more cheering sticks 200 to the user device 400 or reserve at least one or more tickets using one piece of user account information.

Accordingly, in the embodiment, the cheering stick management application 411 may register at least one or more cheering sticks 200 and ticket reservation numbers for one piece of user account information and check and manage each of the registered cheering sticks 200 and ticket reservation numbers.

Specifically, for example, the cheering stick management application 411 may activate a cheering stick 200 to use among the cheering sticks registered in the user device 400 or manage each of the registered cheering sticks 200 by checking a seat-library registered in the cheering stick 200 and so on.

In other words, since the cheering stick management application 411 of the user device 400 according to the embodiment may transmit a seat-library directly to the cheering stick 200 from the user device 400, the cheering stick management application 411 allows a user to perform self-pairing in an auditorium or at home even when the kiosk 100 may not be used due to the flooding of users, long waiting time, and device failure or the user is watching an un-tact performance, thereby reducing time-space restrictions in performing pairing.

Also, in the embodiment, the cheering stick management application 411 may check whether a cheering stick 200 stores a seat-library based on short-distance communication.

Also, in the embodiment, the cheering stick management application 411 may control the light emission of the cheering stick 200 on the user device 400.

Specifically, in the embodiment, the cheering stick management application 411 may control the light emission of the cheering stick 200 on the user device 400 by setting a predetermined mode.

To this end, in the embodiment, the cheering stick management application 411, as shown in FIG. 22, may output at least one or more mode selection buttons IC4, IC5 for setting a predetermined mode on the display.

Also, the user may perform a touch input for setting the predetermined mode based on the user interface.

For example, referring to FIG. 22, if the user selects "concert mode" by touching the first mode selection button IC4, the cheering stick management application 411 performs the S301 to S307 steps shown in FIG. 20 sequentially to transmit a seat-library required for the performance to see to the cheering stick 200.

Also, since the "concert mode" is a mode for the pairing in an auditorium, the cheering stick management application 411 may provide an information related to a location guide of a pairing kiosk 100.

Also, for example, referring back to FIG. 22, when the user selects "self mode" by touching the second mode selection button IC5, the cheering stick management application 411 may provide a light emission setting process through which the user may directly set the data related to the light emission.

Accordingly, the user may set the properties of light output by the light emission component of the cheering stick 200, such as the frequency at which the light of the inter-operating cheering stick 200 repeats light emission and flickering and the color and brightness of the light emitted by the cheering stick 200.

Therefore, through the cheering stick management application 411 according to the embodiment, a user may arbitrarily control the color of the light emitted from the cheering stick 200 before a performance is started or even at a place other than the auditorium using the self mode, thereby improving the use efficiency of the cheering stick 200.

Also, in the embodiment, the cheering stick management application 411 may control the light emission of the cheering stick 200 by receiving a light emission control signal and a control message transmitted using a predetermined communication scheme (e.g., a broadcasting and/or multicasting scheme) to operate the seat-library pre-stored in the cheering stick 200 interoperated.

As described above, a seat-library pairing method and system using short-distance wireless communication according to an embodiment of the present disclosure controls a plurality of cheering sticks through a pre-stored seat-library, thereby directing a plurality of cheering sticks to present an orchestrated performance simultaneously.

Also, a seat-library pairing method and system using short-distance wireless communication according to an embodiment of the present disclosure stores a seat-library for the corresponding performance, thereby minimizing an error due to conflict with a seat-library of another performance.

Also, a seat-library pairing method and system using short-distance wireless communication according to an embodiment of the present disclosure enables the pairing of a cheering stick and a kiosk through an intuitive user experience and reduces the time and inconvenience involved to store a seat-library, thereby improving user convenience.

Also, since a seat-library pairing method and system using short-distance wireless communication according to an embodiment of the present disclosure transmits a seat-library directly to the cheering stick from the user device, a user is enabled to perform self-pairing in an auditorium or at home even when the kiosk may not be used due to the flooding of users, long waiting time, and device failure or the user is watching an un-tact performance, thereby reducing time-space restrictions in performing pairing.

The embodiments of the present disclosure described above may be implemented in the form of program commands which may be executed through various types of computer constituting elements and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be replaced with by one or more software modules to perform the operations of the present disclosure, and vice versa.

Specific implementation of the present disclosure are embodiments, which does not limit the technical scope of the present disclosure in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of this document but has to be defined by the appended claims.

What is claimed is:

1. A pedestal on which a cheering stick and a terminal providing a seat-library to the cheering stick are mounted, the pedestal comprising:
    a main frame;
    a mounting portion included in the main frame and on which the terminal is mounted; and
    a cheering stick holder included in the main frame and on which the cheering stick is mounted, wherein
    the cheering stick holder comprises an insertion hole in which the cheering stick is inserted.

2. The pedestal of claim 1, wherein a first end of the mounting portion is connected to the main frame, and the first end of the mounting portion is configured to rotate against the main frame.

3. The pedestal of claim 2, wherein the mounting portion comprises:
    a rotating portion connected to a first side edge of the main frame;
    a main mounting portion connected to the rotating portion; and
    a wing portion comprising a first sub-wing portion and a second sub-wing portion disposed respectively on a first side and a second side of the main mounting portion.

4. The pedestal of claim 3, wherein the mounting portion rotates to have a predetermined angle against the main frame using the rotating portion as a reference axis.

5. The pedestal of claim 3, wherein the first sub-wing portion and the second sub-wing portion are formed to respectively extend in a first direction and a second direction away from the main mounting portion.

6. The pedestal of claim 1, further comprising:
    a supporting portion supporting the mounting portion so that the mounting portion rotates to have a predetermined angle against the main frame.

7. The pedestal of claim 1, further comprising a tagging portion included in the main frame and tagged by a predetermined device.

8. The pedestal of claim 1, wherein the insertion hole is formed in the main frame.

9. The pedestal of claim 8, further comprising a plurality of cylindrical layers having different diameters contained within the insertion hole,
    wherein a second cylindrical layer of the plurality of cylindrical layers having a second diameter is contained inside a first cylindrical layer of the plurality of cylindrical layers having a first diameter, and a third cylindrical layer of the plurality of cylindrical layers having a third diameter is contained inside the second cylindrical layer, and
    wherein the first diameter is larger than the second diameter, and the second diameter is larger than the third diameter.

10. The pedestal of claim 9, wherein each of the first cylindrical layer, the second cylindrical layer, and the third cylindrical layer has a step structure at an end of an outer surface thereof, respectively.

11. The pedestal of claim 1, wherein a concave portion providing an accommodating space to contain the mounting portion is formed on the main frame, and a protruding portion having a structure in which one side adjacent to the mounting portion protrudes with a predetermined size of a step is formed on a partial area of the concave portion.

12. A seat-library pairing system providing a seat-library to a cheering stick, the seat-library pairing system comprising:
    a main frame;
    a cheering stick holder included in the main frame and on which the cheering stick is mounted;
    a terminal providing a seat-library to the cheering stick; and
    a mounting portion included in the main frame and on which the terminal is mounted, wherein
    the cheering stick holder comprises an insertion hole in which the cheering stick is inserted.

13. The seat-library pairing system of claim 12, wherein the cheering stick holder comprises a cheering stick pairing module that detects whether the cheering stick approaches and, when detecting the approach of the cheering stick, transmits data from the terminal to the cheering stick by communicating with the terminal and the cheering stick.

14. The seat-library pairing system of claim 12, further comprising a tagging portion included in the main frame and tagged by a predetermined device.

15. The seat-library pairing system of claim 14, wherein the terminal, based on user account information obtained by the tagging portion, transmits a predetermined seat-library to the mounted cheering stick.

16. The seat-library pairing system of claim 12, wherein the insertion hole is formed in the main frame.

17. The seat-library pairing system of claim 16, further comprising a plurality of cylindrical layers having different diameters contained within the insertion hole,
    wherein a second cylindrical layer of the plurality of cylindrical layers having a second diameter is contained inside a first cylindrical layer of the plurality of cylindrical layers having a first diameter, and a third cylindrical layer of the plurality of cylindrical layers having a third diameter is contained inside the second cylindrical layer, and
    wherein the first diameter is larger than the second diameter, and the second diameter is larger than the third diameter.

18. The seat-library pairing system of claim 17, wherein each of the first cylindrical layer, the second cylindrical layer, and the third cylindrical layer has a step structure at an end of an outer surface thereof, respectively.

* * * * *